United States Patent
Choi et al.

(10) Patent No.: US 12,441,596 B2
(45) Date of Patent: Oct. 14, 2025

(54) WINE STORAGE DEVICE AND WINE DISPENSING METHOD USING SAME

(71) Applicant: LG ELECTRONICS INC., Seoul (KR)

(72) Inventors: Hwayun Choi, Seoul (KR); Kichu Hong, Seoul (KR); Ja Yoen Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 34 days.

(21) Appl. No.: 18/267,981

(22) PCT Filed: Dec. 13, 2021

(86) PCT No.: PCT/KR2021/018898
§ 371 (c)(1),
(2) Date: Jun. 16, 2023

(87) PCT Pub. No.: WO2022/131726
PCT Pub. Date: Jun. 23, 2022

(65) Prior Publication Data
US 2024/0067513 A1 Feb. 29, 2024

(30) Foreign Application Priority Data
Dec. 16, 2020 (KR) .................. 10-2020-0176568

(51) Int. Cl.
*B67D 1/00* (2006.01)
*B67D 1/08* (2006.01)

(52) U.S. Cl.
CPC ......... *B67D 1/0009* (2013.01); *B67D 1/0857* (2013.01); *B67D 1/0895* (2013.01)

(58) Field of Classification Search
CPC .. B67D 1/0009; B67D 1/0857; B67D 1/0895; B67D 3/0009; B67D 3/0022; B67D 7/80;
(Continued)

(56) References Cited

U.S. PATENT DOCUMENTS 4,881,380 A * 11/1989 Mrugala ............ B67D 3/0009
165/145
6,357,253 B1 * 3/2002 Condy ............ B65D 81/3883
62/530
(Continued)

FOREIGN PATENT DOCUMENTS

JP 4110687 7/2008
KR 10-1998-0073959 11/1998
(Continued)

OTHER PUBLICATIONS

International Search Report dated Mar. 24, 2022 issued in Application No. PCT/KR2021/018898.
(Continued)

*Primary Examiner* — Jeremy Carroll
(74) *Attorney, Agent, or Firm* — KED & ASSOCIATES, LLP

(57) ABSTRACT

Proposed are a wine storage device and a wine dispensing method using same. A storage space (32) storing a wine bottle (B) may be formed in a cabinet (10), and the cabinet (10) may be provided with a dispensing head (100) dispensing wine (B) to the outside. Further, a temperature adjustment module (200) may be placed on a dispensing path for delivering the wine to the dispensing head (100), and the temperature adjustment module (200) may adjust the temperature of the wine being dispensed through the dispensing head (100). Here, the temperature adjustment module (200) may include a heating unit and a cooling unit. Accordingly, the wine may be heated or cooled while being dispensed, and thus have a drinking temperature different from a storage temperature.

5 Claims, 18 Drawing Sheets

(58) Field of Classification Search
CPC . B05B 11/0002; B05C 5/001; B05C 11/1042; B05C 17/00523; B65D 83/72; B65D 88/74
USPC ...................................................... 222/146.6
See application file for complete search history.

(56) References Cited

U.S. PATENT DOCUMENTS

| | | | |
|---|---|---|---|
| 6,568,660 B1* | 5/2003 | Flanbaum | B65D 47/06 |
| | | | 222/189.09 |
| 9,676,508 B2* | 6/2017 | Devoy | B01F 25/31242 |
| 10,160,630 B1* | 12/2018 | Chung | A47G 23/00 |
| 2010/0005811 A1 | 1/2010 | Jaffe et al. | |
| 2010/0294804 A1* | 11/2010 | Dalchau | B67D 1/0014 |
| | | | 251/129.01 |
| 2011/0143000 A1 | 6/2011 | Fiset | |
| 2016/0175783 A1 | 6/2016 | Jarrousse et al. | |
| 2016/0175785 A1 | 6/2016 | Li et al. | |
| 2017/0349868 A1 | 12/2017 | Koretz et al. | |
| 2018/0194607 A1 | 7/2018 | Diffenderfer | |
| 2020/0231426 A1 | 7/2020 | Edwards et al. | |
| 2021/0333046 A1* | 10/2021 | Cleland | F25D 31/002 |

FOREIGN PATENT DOCUMENTS

| | | |
|---|---|---|
| KR | 10-0889966 | 3/2009 |
| KR | 20-0463774 | 11/2012 |
| KR | 10-2017-0114490 | 10/2017 |
| WO | WO 2006/044240 | 4/2006 |
| WO | WO 2013/042101 | 3/2013 |

OTHER PUBLICATIONS

International Search Report dated Mar. 30, 2022 issued in Application No. PCT/KR2021/018894.
Extended European Search Report dated Sep. 26, 2024 issued in Application No. 21907030.7.
Extended European Search Report dated Oct. 31, 2024 issued in Application No. 21907029.9.

* cited by examiner

WINE STORAGE DEVICE AND WINE DISPENSING METHOD USING SAME

CROSS-REFERENCE TO RELATED PATENT APPLICATIONS

This application is a U.S. National Stage Application under 35 U.S.C. § 371 of PCT Application No. PCT/KR2021/018898, filed Dec. 13, 2021, which claims priority to Korean Patent Application No. 10-2020-0176568, filed Dec. 16, 2020, whose entire disclosures are hereby incorporated by reference.

TECHNICAL FIELD

The present disclosure relates to a wine storage device and, more particularly, to a storage device for storing a wine bottle and a method for dispensing wine from the wine bottle stored in the storage device.

BACKGROUND ART

Generally, a refrigerator is a home appliance that allows low-temperature storage of food in an inner storage space shielded by a door. To this end, the refrigerator is configured to cool the inside of the storage space by using cool air generated through heat exchange with a refrigerant circulating in a refrigerating cycle so that food can be stored in an optimal state.

Recently, a refrigerator is gradually becoming multi-functional in accordance with changes in dietary life and the trend of high-end products, and a refrigerator equipped with various structures and convenience devices that enable a user's convenience and efficient use of internal space is being released. In particular, as the consumption and preference of alcoholic beverages such as wine and champagne increase, a refrigerator exclusively for wine is being used to store wine.

In the case of wine, it is necessary to set the appropriate temperature value of wine according to the type of wine. This is because flavors of wine can be softer and aroma thereof can be intensified when the wine is at the right temperature. To this end, a wine refrigerator provides a function to adjust the storage temperature of wine.

For example, in U.S. Pat. No. 6,357,253 B1 (Prior art 1), International Publication No. WO2006044240A2 (Prior art 2), and Korean Patent No. 10-0889966 (Prior art 3), techniques for controlling the temperature of stored wine are disclosed.

Meanwhile, wine may have different storage and drinking temperatures. For example, it is known that in the case of champagne or sparkling wine, the storage temperature of 5 to 8 degrees and the drinking temperature of about 7 degrees are appropriate, and in the case of red wine, the storage temperature of 10 to 13 degrees and the drinking temperature of about 12 degrees are appropriate.

However, conventional wine refrigerators can adjust the storage temperature of wine, but do not provide a function of differently setting the drinking temperature of wine. Accordingly, it is inevitable that the storage temperature of wine is the drinking temperature thereof. Of course, although a user can separately heat or cool the wine to a desired drinking temperature, this is cumbersome.

In addition, when the temperature of wine is changed by a heater or cooler, there is a concern that the characteristics of the wine may be altered in the process. When the temperature of wine changes rapidly, the taste and aroma of the wine may change.

DISCLOSURE

Technical Problem

The present disclosure has been made to solve the above problems occurring in the prior art, and is intended to propose a wine storage device which can make the storage temperature of wine and the drinking temperature (a dispensing temperature) of wine different from each other.

Another purpose of the present disclosure is to control the speed of heating or cooling wine for controlling the drinking temperature of wine so that taste or color of the wine is prevented from deteriorating.

Still another purpose of the present disclosure is to simplify the structure of a temperature adjustment module for controlling the drinking temperature of wine.

Technical Solution

According to the characteristics of the present disclosure to accomplish the above objectives, a storage space in which a wine bottle is stored may be defined inside a cabinet, and the cabinet may be provided with a dispensing head for dispensing wine to the outside. Furthermore, a temperature adjustment module may be disposed in a dispensing path through which the wine is delivered to the dispensing head. The temperature adjustment module may adjust the temperature of the wine discharged to the dispensing head. In this case, the temperature adjustment module may include a heating unit and a cooling unit. Accordingly, the wine may be heated or cooled while being dispensed, and thus the drinking temperature of the wine may be different from the storage temperature thereof.

In this case, the heating unit may constitute a portion of a path through which the wine is dispensed, and may have a circulation heating path. Furthermore, the cooling unit may constitute a portion of the path through which the wine is dispensed, but may constitute a path independent of the heating unit, and may have a circulation cooling path. Accordingly, while wine is circulated through the heating unit or the cooling unit multiple times, the temperature of the wine may be adjusted gradually, so the rapid temperature change of the wine may be prevented.

Additionally, the temperature adjustment module may connect the dispensing head with the wine bottle. In this case, the temperature adjustment module may constitute a portion of the dispensing path, and thus the internal structure of a wine storage device may be simplified.

In addition, a main control part may be disposed in the cabinet and may control the temperature adjustment module so that a dispensing temperature of the wine can be adjusted. In this case, the main control part may automatically control the temperature adjustment module so that the dispensing temperature of the wine is equal to a preset dispensing temperature thereof in a process in which the wine stored in the storage space is delivered to the dispensing head.

In addition, the main control part may control the number of times at which the wine circulates through the circulation heating path or the circulation cooling path, or may control speed at which the wine circulates through the circulation heating path or the circulation cooling path. Accordingly, through automatic control by the main control part, the drinking temperature of wine may be adjusted to a preset value.

In this case, the preset dispensing temperature may be a temperature input through an input part provided in the cabinet or a temperature previously input into a database. That is, the drinking temperature may be preset to be a temperature arbitrarily input by a user.

In addition, the database may store at least one piece of information among the name, type, production area, production year, an appropriate storage temperature, an appropriate drinking temperature, and the preset dispensing temperature of the wine, and based on this, the preset dispensing temperature may be determined.

Additionally, a temperature sensor may be disposed inside the cabinet. In this case, the temperature sensor may include a first sensor for measuring the temperature of wine stored in the storage space, and a second sensor for measuring the temperature of the wine passing through the temperature adjustment module.

In addition, the temperature adjustment module may include a direct dispensing part connecting a dispensing pipe connected to the wine bottle with a nozzle connection pipe. The direct dispensing part may allow wine to be dispensed directly without passing through the heating unit or the cooling unit when the storage temperature and the preset dispensing temperature of the wine are equal to each other.

Additionally, the direct dispensing part, the heating unit, and the cooling unit may be connected in parallel with each other. In this case, the direct dispensing part, the heating unit, and the cooling unit may be clustered together to reduce the overall size of the temperature adjustment module, and may be controlled through a relatively small number of valves.

In addition, the heating unit may include a heating means to heat the wine passing through the heating unit, and the cooling unit may include a cooling means to cool the wine passing through the cooling unit.

In addition, the heating unit may include at least two heating pipes connected to each other to form a closed loop path, wherein the at least two heating pipes may be connected in parallel with each other. Accordingly, the wine may pass through only one of the at least two heating pipes.

Furthermore, in the cabinet, a cooling device may be installed at the rear of the storage space, and the cooling device may be controlled by the main control part. The cooling device may keep the wine at an appropriate temperature.

In addition, a gas tank may be disposed in the cabinet to prevent oxidation of the wine by delivering an inert gas to the inside of the wine bottle. The gas tank may prevent the wine from being oxidized in contact with air during storage of the wine.

A method of dispensing wine according to the present disclosure may include comparing the storage temperature and the preset dispensing temperature with each other after acquiring the storage temperature and the preset dispensing temperature of the wine stored in the storage space of the wine storage device. In addition, when a difference between the storage temperature and the preset dispensing temperature is greater than or equal to a preset value, the heating unit or the cooling unit of the temperature adjustment module disposed in the wine storage device may operate.

In addition, wine contained in the wine bottle may be delivered to the temperature adjustment module by a supply means provided in the wine storage device, and may circulate through the heating unit or the cooling unit of the temperature adjustment module, and finally, the wine changed to have the preset dispensing temperature may be discharged through the dispensing head.

In this case, when the difference between the storage temperature and the preset dispensing temperature exceeds the preset value, the wine may circulate through the heating unit or the cooling unit at least twice.

Advantageous Effects

As described above, the wine storage device and a wine dispensing method using the same according to the present disclosure have the following effects.

According to the present disclosure, by placing the temperature adjustment module in the dispensing path of wine, a drinking temperature can be adjusted to be different from a storage temperature. Accordingly, since a user can drink dispensed wine with the drinking temperature adjusted, there is no need to separately adjust the temperature of wine, and the convenience of use can be improved.

In this case, according the present disclosure, wine can be provided by automatically adjusting an appropriate drinking temperature for each type of wine, or wine can be provided by being adjusted to a temperature preset by a user.

Particularly, according to the present disclosure, the temperature adjustment module includes the heating unit and the cooling unit, so wine can be heated or cooled. Accordingly, various drinking temperatures can be realized through the wine storage device, and a user can obtain a drinking temperature suitable for the unique characteristics of wine.

In addition, according to the present disclosure, each of the heating unit and the cooling unit included in the temperature adjustment module may constitute a circulation path, and the drinking temperature of wine may be adjusted gradually according to the number of times at which the wine circulates through the heating unit and the cooling unit. Accordingly, the deterioration of the characteristics of wine due to the rapid change of the temperature of the wine may be prevented, and the flavor of the wine may be enhanced.

Additionally, in the present disclosure, the temperature adjustment module may constitute a portion of the dispensing pipe connecting the wine bottle with the dispensing head. Accordingly, even if the temperature adjustment module is provided, the internal structure of the wine storage device may be configured to be simple and efficient.

In addition, in the present disclosure, the temperature adjustment module may directly discharge wine without adjusting the temperature of the wine or may discharge the wine after the heating/cooling of the wine according to a difference between the storage temperature and drinking temperature of the wine. Accordingly, the wine storage device of the present disclosure may have the advantage of high usability since the wine storage device can respond to various temperature settings.

Additionally, the wine storage device of the present disclosure may supply an inert gas to the inside of an opened wine bottle, preventing oxidation of wine. Accordingly, even if the wine is stored in an open state, the taste of the wine may be prevented from deteriorating through oxidation.

In addition, the wine storage device of the present disclosure may include the cooling device to cool the wine bottle. In this case, the cooling device may provide the most appropriate storage temperature according to the type and current state of wine, thereby improving the storage quality of wine.

Additionally, according to the present disclosure, in the heating unit (or the cooling unit) constituting the temperature adjustment module, two or more pipes may be connected to each other to form a circulation path, wherein the two or more pipes may be configured in parallel. Accordingly, wine may be discharged after being continuously heated (cooled) while circulating through the pipes connected in parallel, or may be discharged directly through only one of the pipes connected in parallel. Accordingly, the length of an entire path for heating (cooling) wine may be preset variously, and the temperature of wine may be precisely adjusted.

MODE FOR INVENTION

Figure 1:
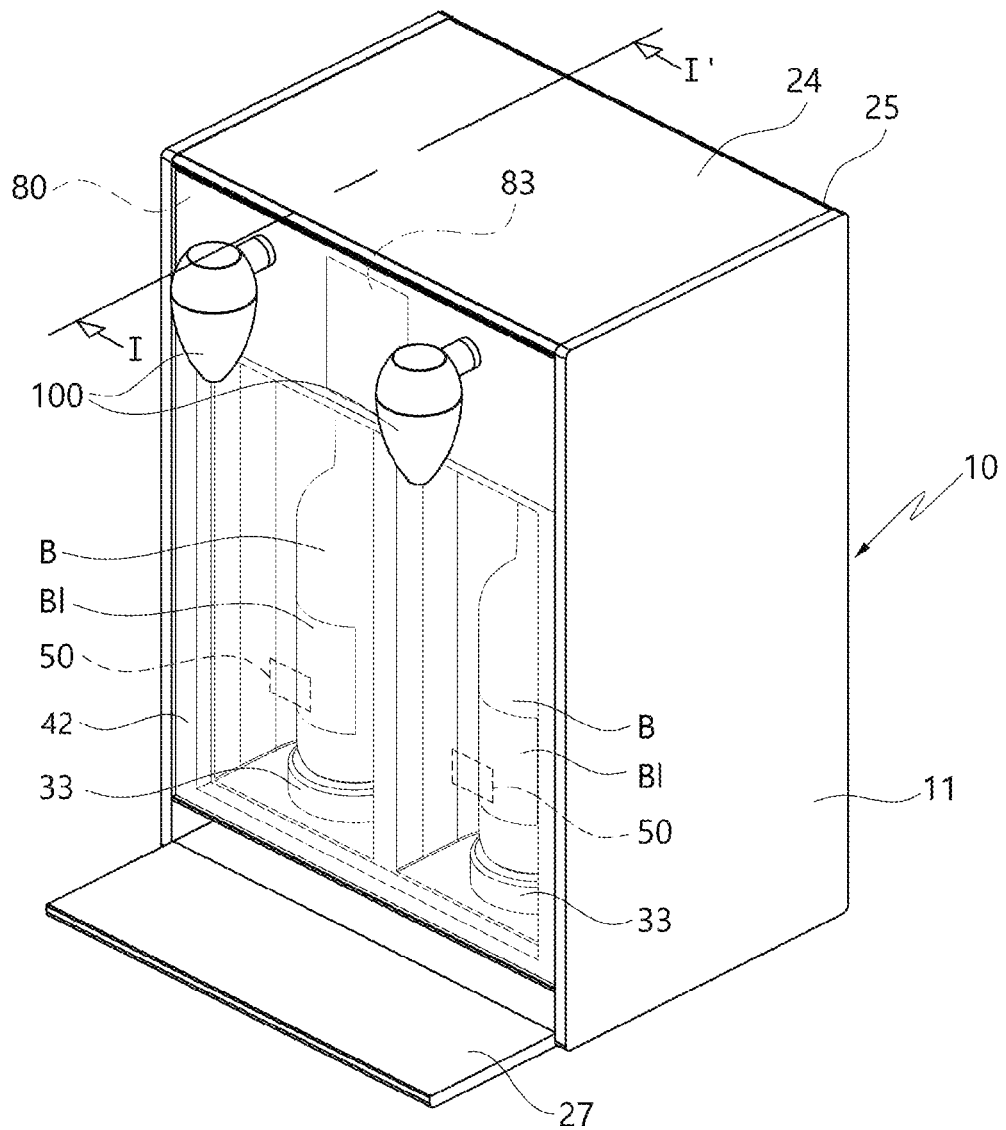
FIG. 1 is a perspective view illustrating the configuration of a wine storage device according to an embodiment of the present disclosure.

Hereinbelow, an embodiment of the present disclosure will be described in detail with reference to the accompanying drawings. It should be noted that in adding reference numerals to the components of each drawing, the same components have the same reference numerals as possible even though they are displayed on different drawings. In addition in describing the embodiment of the present disclosure, when it is determined that detailed descriptions of related well-known structures or functions hinder understanding of the embodiment of the present disclosure, detailed descriptions thereof will be omitted.

Additionally, in describing the components of the embodiment of the present disclosure, terms such as first, second, A, B, (a), and (b) may be used. These terms are only for distinguishing the components from other components, and the nature or order of the components is not limited by the terms. When a component is described as being "connected" or "coupled" to another component, the component may be directly connected to or coupled to the another component, but it should be understood that still another component may be "connected" or "coupled" thereto between each component.

Hereinbelow, an embodiment of the present disclosure will be described in detail with reference to the accompanying drawings. It should be noted that in adding reference numerals to the components of each drawing, the same components have the same reference numerals as possible even though they are displayed on different drawings. In addition in describing the embodiment of the present disclosure, when it is determined that detailed descriptions of related well-known structures or functions hinder understanding of the embodiment of the present disclosure, detailed descriptions thereof will be omitted.

Additionally, in describing the components of the embodiment of the present disclosure, terms such as first, second, A, B, (a), and (b) may be used. These terms are only for distinguishing the components from other components, and the nature or order of the components is not limited by the terms. When a component is described as being "connected" or "coupled" to another component, the component may be directly connected to or coupled to the another component, but it should be understood that still another component may be "connected" or "coupled" thereto between each component.

The embodiment of a wine storage device of the present disclosure will be described with reference to the accompanying drawings. The wine storage device of the present disclosure may dispense wine contained in a wine bottle B while storing the wine bottle B with a lid open. The wine storage device may adjust the storage temperature of the wine and control the temperature of the wine being dispensed, thereby allowing the drinking temperature (a dispensing temperature) of wine delivered to a user and the storage temperature to be different from each other. Hereinafter, a structure related to the function of the wine storage device will be described in detail.

For reference, appropriate storage temperature and drinking temperatures of wine may be different from each other. For example, in the case of sparkling wine or champagne, the drinking temperature may be preset higher than the storage temperature, and may be preset lower than the storage temperature according to a user's preference. In the present disclosure, the drinking temperature may be automatically adjusted.

Figure 2:
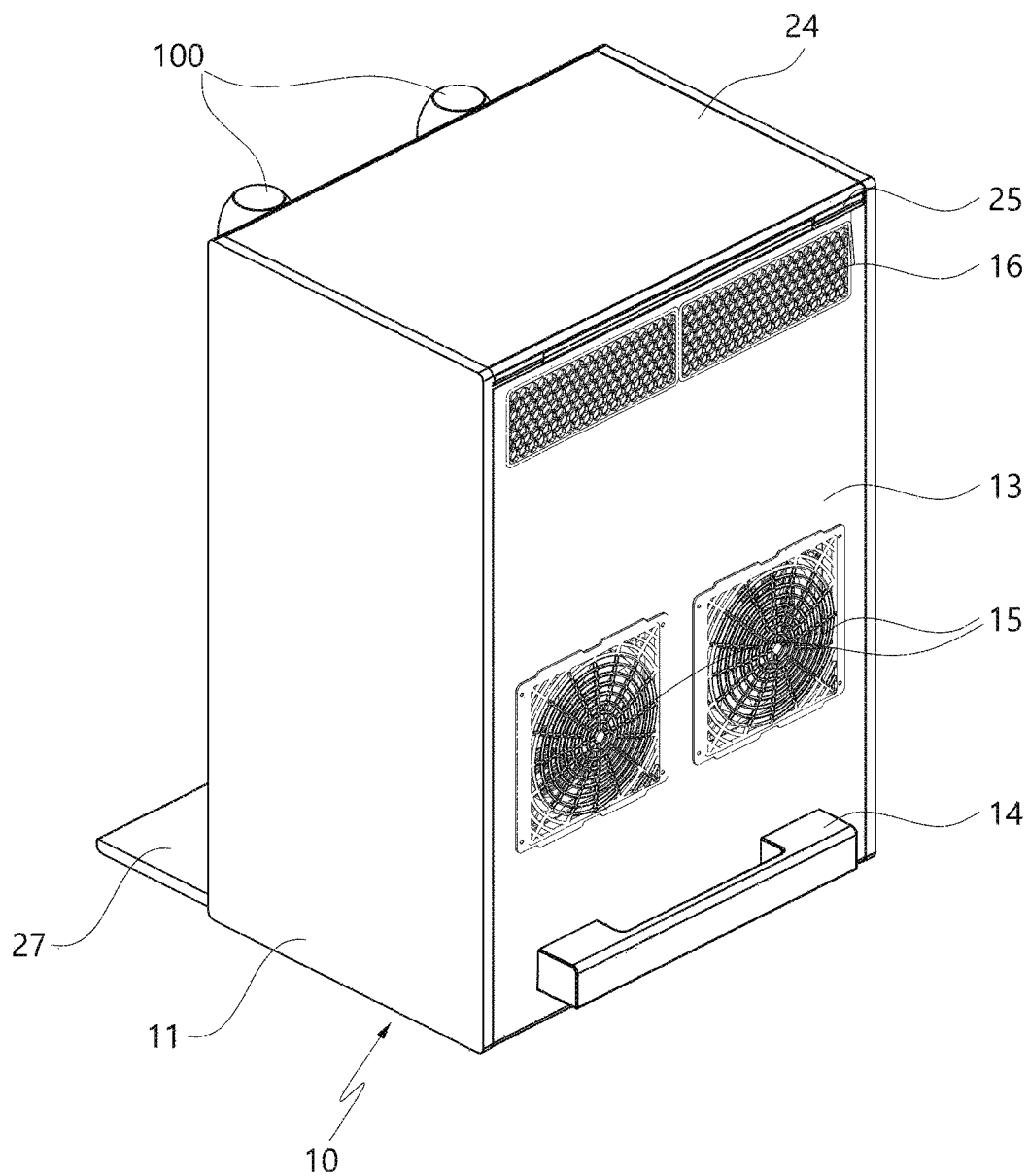
FIG. 2 is the configuration of the wine storage device of FIG. 1 shown at a different angle from an angle at which the wine storage device is illustrated in FIG. 1.

Referring to FIGS. 1 and 2, a cabinet 10 may constitute the exterior of a refrigerator. As illustrated in the drawings, the cabinet 10 may be made to have a relatively short front-to-rear width. Accordingly, in the present embodiment, the refrigerator has a small bottom area and thus may not require a large installation area, so the refrigerator may be placed on the floor or installed on a table.

In the present embodiment, the cabinet 10 may have an approximately hexahedral shape and may have an installation space S inside the cabinet 10. An inner casing 30 and a cooling device C to be described below may be installed in the installation space S. Furthermore, a storage space 32 may be defined inside the inner casing 30 so that the wine bottle B can be received in the storage space 32.

The installation space S may mean the entire inner space of the cabinet 10, and the storage space 32 may be a space defined inside the inner casing 30. Accordingly, it may be considered that the storage space 32 is defined inside the installation space S. The storage space 32 may be a space in which the wine bottle B is stored and may be a space created by combining multiple parts including a cooling guide 40 to be described below.

The cabinet 10 may include one pair of side plates 11, a rear plate 13, an upper cover 20, and a lower cover 26. The one pair of side plates 11, the rear plate 13, the upper cover 20, and the lower cover 26 may be assembled together to define the installation space S inside and constitute the exterior of the refrigerator. The door 42 to be described below may be installed on the front surface of the cabinet 10, and this will be described again below.

Looking at the rear plate 13 constituting the cabinet 10, the rear plate 13 may include an air introduction hole and an air discharge hole. The air introduction hole may be a part through which external air is introduced, and the air discharge hole may be a part through which internal air of the refrigerator is discharged to the outside. In the present embodiment, the air introduction hole may be formed in an introduction grille 15 assembled to the rear plate 13, and the air discharge hole may be formed in a discharge grille 16 assembled to the rear plate 13. Of course, the introduction grille 15 and the discharge grille 16 may be omitted, and the air introduction hole and the air discharge hole may be directly formed in the rear plate 13.

The rear plate 13 may have a spacer 14. The spacer 14 may protrude outward from the rear plate 13, that is, toward a side opposite to the installation space S of the refrigerator. The spacer 14 may be intended to keep a distance between the rear plate 13 and the wall surface of an installation place in which the refrigerator is installed, and is made long in the left and right directions as shown in FIG. 2. The spacer 14 may naturally form an air flow space between the rear plate 13 and the wall surface of the installation place. Such a spacer 14 may also function as a kind of handle. That is, a user may hold the spacer 14 and move the refrigerator.

The upper cover 20 may be assembled on the upper sides of the one pair of side plates 11 and the rear plate 13, and may constitute the upper surface of the installation space S. In the present embodiment, the upper cover 20 may cover the upper side of the cabinet 10, but may have an open structure in some cases. For example, a hinge 25 may be connected to the upper cover 20, and the upper cover 20 may open the installation space S while rotating around the hinge 25. Reference numeral 24, which is not described, denotes an outer cover covering the upper cover 20.

The lower cover 26 may be located on the bottom side of the cabinet 10 corresponding to the opposite side of the upper cover 20. The lower cover 26 may constitute the lower surface of the cabinet 10 and have a flat plate structure. Since the lower cover 26 provides a surface on which the refrigerator is installed, it is preferable that the bottom surface of the lower cover 26 is formed as a flat surface.

The lower cover 26 may have a support plate 27. The support plate 27 may be a part protruding forward from the lower cover 26 and may be regarded as a part of the support plate 27. The support plate 27 may be provided at a position facing a dispensing head 100 to be described below. Accordingly, when a beverage is dispensed through the dispensing head 100 while a cup is placed on the support plate 27, the cup may be filled with the beverage.

The inner casing 30 may be installed inside the cabinet 10. The inner casing 30 may be installed in the installation space S of the cabinet 10 and may be installed by being surrounded by the cabinet 10. The storage space 32 may be formed inside the inner casing 30, and the wine bottle B may be stored in the storage space 32. The storage space 32 of the inner casing 30 may include multiple storage spaces.

The inner casing 30 may have a three-dimensional structure surrounding the storage space 32 based on the storage space 32 at the center of the inner casing. In the present embodiment, the inner casing 30 may be seen as an approximate hexahedral shape, but is not necessarily limited thereto. The inner casing 30 may be made entirely or at least partially of a non-metallic material. In the present embodiment, in the inner casing 30, a receiving guide 35 at the upper side thereof may be made of a non-metallic material, and the cooling guide 40 at the lower side thereof may be made of a metallic material.

A support part 33 may be arranged on a bottom part 31b. The support part 33 may protrude from the bottom part 31b in a direction toward the storage space 32 and have an approximately cylindrical shape. The support part 33 may be a part that supports the lower surface of the wine bottle B. The support part 33 preferably has an area equal to or greater than the lower surface of the wine bottle B.

The support part 33 may be moved up and down through a separate driving part (not shown). The support part 33 may be installed on the bottom part 31b in a form of being capable of moving up and down. That is, an up-and-down moving body may protrude upward from the bottom part 31b or may be retracted in the opposite direction.

Accordingly, since the up-and-down moving body has a structure capable of moving up and down, wine bottles B of various heights may be accommodated in the storage space 32. That is, when a wine bottle B having a high height is received in the storage space, the up-and-down moving body may descend to further secure the height of the storage space 32, and when a wine bottle B having a low height is received in the storage space, the up-and-down moving body may move upward to fill the remaining space.

Meanwhile, the front surface of the inner casing 30 may be open, and the storage space 32 may also be open forward, and the open portions may be covered by the door 42. The door 42 may be installed on the front surface of the inner casing 30 corresponding to the opposite side of the cooling device C with the storage space 32 placed between the door and the cooling device, and may be made of a heat insulating material.

Looking at the door 42 constituting one side of the insulated space, the door 42 may cover the storage space 32 together with the cooling guide 40 provided in the inner casing 30. More specifically, the cooling guide 40, the door 42, and the bottom part 31b may together define the storage space 32, and the upper part of the storage space 32 may be selectively covered by a cover assembly 90 and the door 42.

Figure 4:
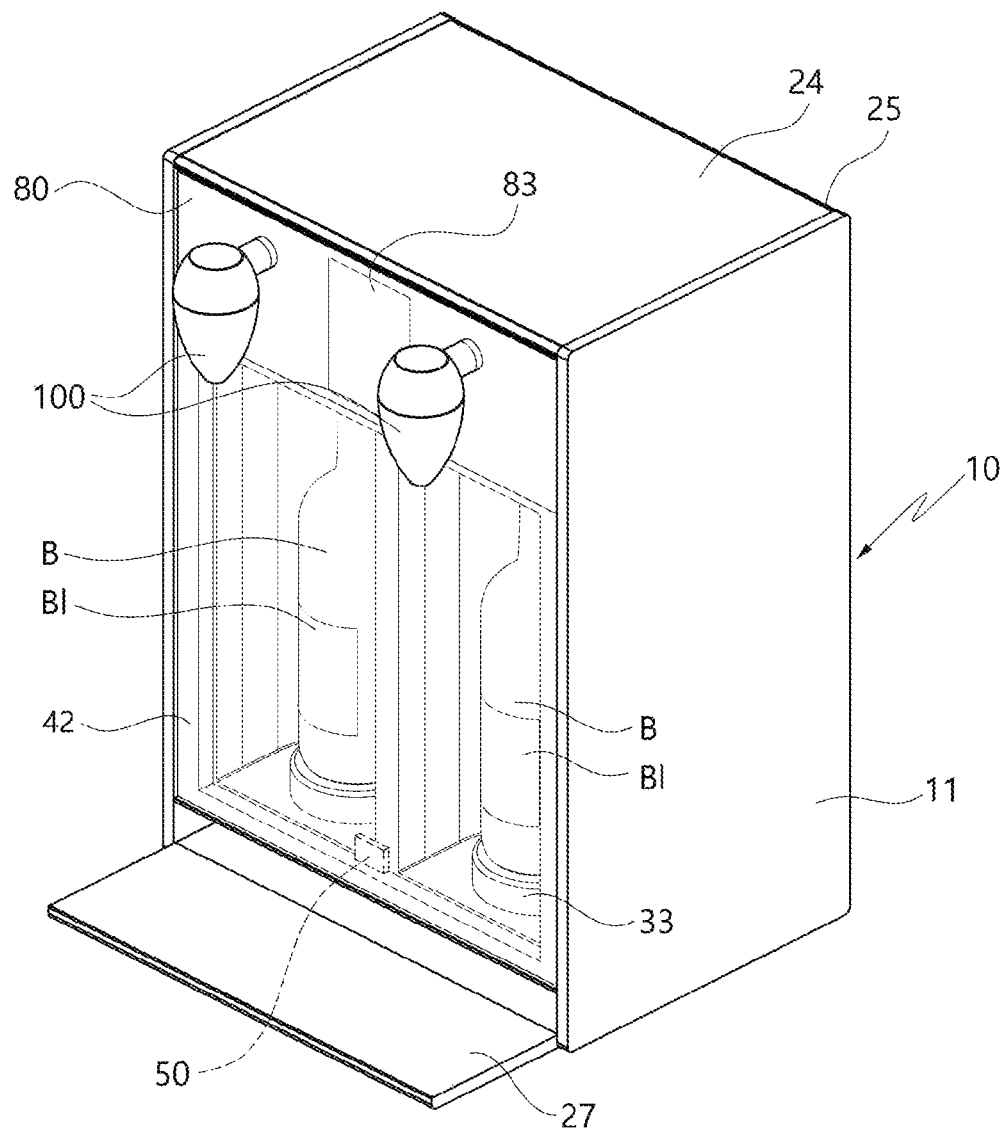
FIG. 4 is a perspective view illustrating a state in which a door constituting the wine storage device of the present disclosure according to the embodiment is opened at a first angle.

The door 42 may open the storage space 32 while swinging. As illustrated in FIG. 4, when the door 42 is opened, the storage space 32 may be open so that the wine bottle B can be accommodated in the storage space 32.

Referring to FIG. 4, the door 42 may be composed of at least one insulating glass. In the present embodiment, the door 42 may be composed of a first panel 43 and a second panel 44, each of which is insulating glass. Accordingly, a user may see the storage space 32 through the transparent first panel 43 and second panel 44 and observe the wine bottle B stored in the storage space 32. A user may check the type of beverage stored in the storage space 32 through the door 42. An empty space may be defined between the first panel 43 and the second panel 44, and a vacuum may be formed in the empty space.

Next, looking at the cooling device C, the cooling device C may be installed in the installation space S and may serve to lower the temperature of the storage space 32. When the temperature of the storage space 32 decreases, the temperature of the wine bottle B stored in the storage space 32 may also decrease. In the present embodiment, at least a portion of the cooling device C may contact the inner casing 30 surrounding the storage space 32 so as to improve cooling performance. For example, the cooling device C may be in contact with the cooling guide 40.

The cooling device C may be installed adjacently to the storage space 32 to lower the temperature of the storage space 32, and may be installed in various locations except a position between the storage space 32 and the door 42. For example, the cooling device C may be installed on the left and right sides of the storage space 32 or on the rear side of the storage space 32. In the present embodiment, the cooling device C may cool the cooling guide 40, and accordingly, the storage space 32 located inside the cooling guide 40 may be cooled.

Figure 3:
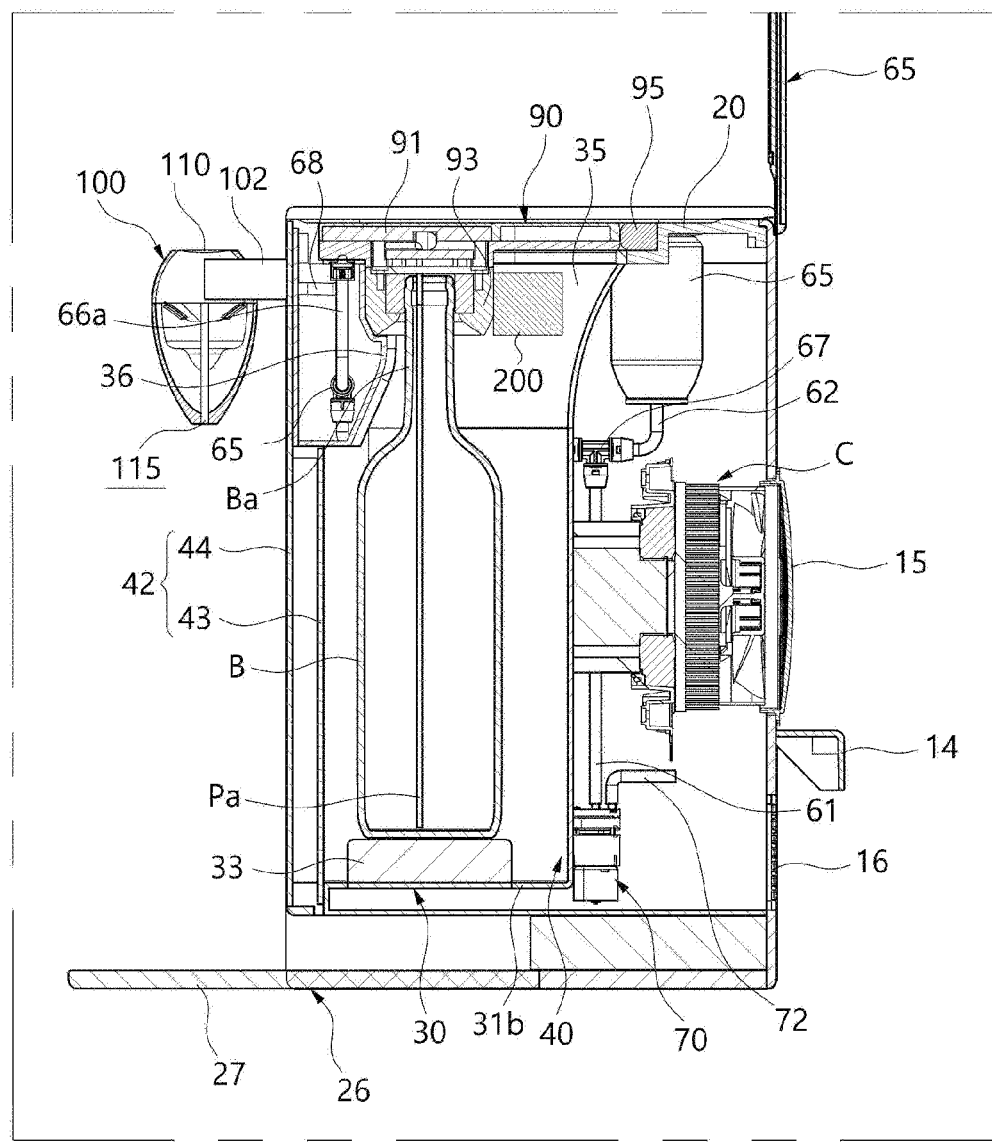
FIG. 3 is a cross-sectional view taken along line I-I' of FIG. 1.

Preferably, as illustrated in FIG. 3, the cooling device C may be installed at the rear of the storage space 32 corresponding to the opposite side of the door 42. When the cooling device C is installed at the rear of the storage space 32, one side of the cooling device C may face the introduction grille 15 and the discharge grille 16 provided on the rear plate 13, thereby increasing cooling efficiency. Additionally, in the present embodiment, since the widest installation space S is secured at the rear of the storage space 32, it is easy to install the cooling device C.

The cooling device C may include multiple cooling devices. More specifically, the number of the cooling devices C may be the same as the number of the storage spaces 32. In the present embodiment, since the storage space 32 includes two storage spaces, the cooling device C may include two cooling devices. The multiple cooling devices C may serve to lower the temperatures of the separate storage spaces 32, respectively. Accordingly, the multiple storage spaces 32 may be independently cooled because internal temperatures thereof may be preset to be different.

In the present embodiment, the cooling device C may include a thermoelectric element (reference numeral not given), and the thermoelectric element can maintain the temperature of the storage space 32 low by utilizing a Peltier effect. In addition, the cooling device C may have a structure for effectively cooling the storage space 32 by connecting the low-temperature part of the thermoelectric element toward the storage space 32 and dissipating heat from a high-temperature part thereof. Alternatively, the cooling device C may constitute a refrigeration cycle including a compressor, a condenser, an evaporator, and the like.

A vision sensor part 50 may be disposed in the door 42. The vision sensor part 50 is for acquiring information on wine from a label B1 of the wine by capturing the label B1. The vision sensor part 50 may include a video camera.

That is, the vision sensor part 50 may obtain an image through the camera corresponding to the human eye and may be used to obtain various information (a place of origin, a type, a production year, and brand name, etc.) which the image has. Furthermore, the vision sensor part 50 may transfer the acquired image to a main control part 150, and an image processing part 154 included in the main control part 150 or connected to the main control part 150 may finally obtain necessary information through an image processing process of extracting features (characters, symbols, etc.) by using mathematical techniques.

In the present embodiment, the vision sensor part 50 may be disposed on an inner surface of the door 42. That is, the vision sensor part 50 may be disposed to face the storage space 32 when the door 42 is closed. Accordingly, when the door 42 is completely closed or partially closed, the vision sensor part 50 may capture the label B1 of the wine bottle B stored in the storage space 32.

Figure 5:
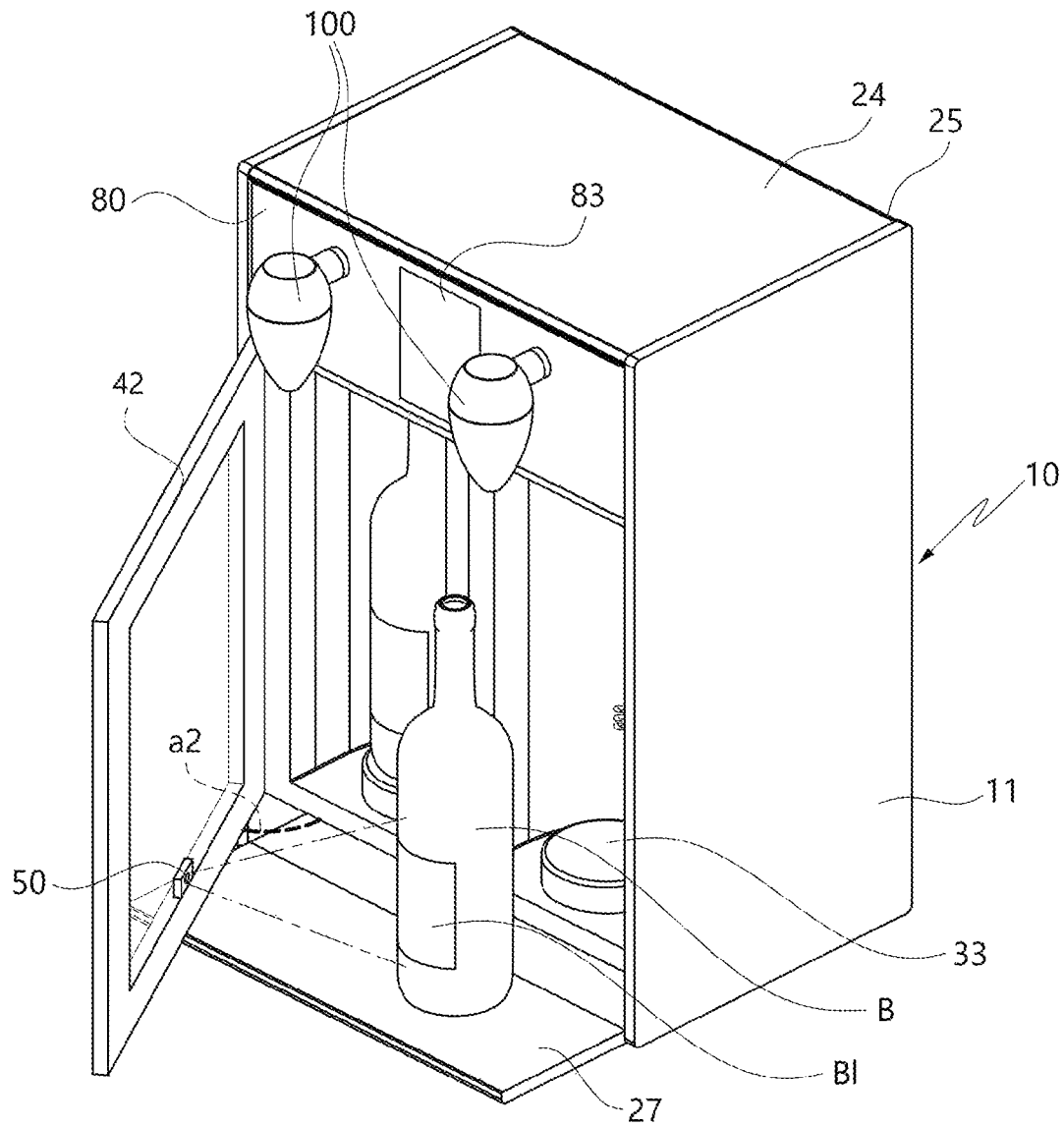
FIG. 5 is a perspective view illustrating a state in which the door constituting the wine storage device of the present disclosure according to the embodiment is opened at a second angle.

The vision sensor part 50 may be installed on the inner surface of the door 42 at a height suitable for the height of the label B1 (see FIG. 1), or may be disposed on the lower part of the door 42 (see FIGS. 3 to 5). When the vision sensor part 50 is disposed at the middle height of the door 42, the vision sensor part 50 may capture the label B1 more accurately by facing the label B1. When the vision sensor part 50 is disposed on the lower part of the door 42, the capturing angle of the vision sensor part 50 may be adjusted upward to face the label B1.

Alternatively, the vision sensor part 50 may be installed on the upper part of the door 42 or may be disposed inside the storage space 32 instead of the door 42. Furthermore, the vision sensor part 50 may be disposed not on the door 42 but on the front upper part of the wine storage device corresponding to the upper part of the door 42. In this case, when the wine bottle B is placed in front of the door 42 so that the label B1 faces the inside of the storage space 32, the vision sensor part 50 may capture the label B1.

Figure 6:
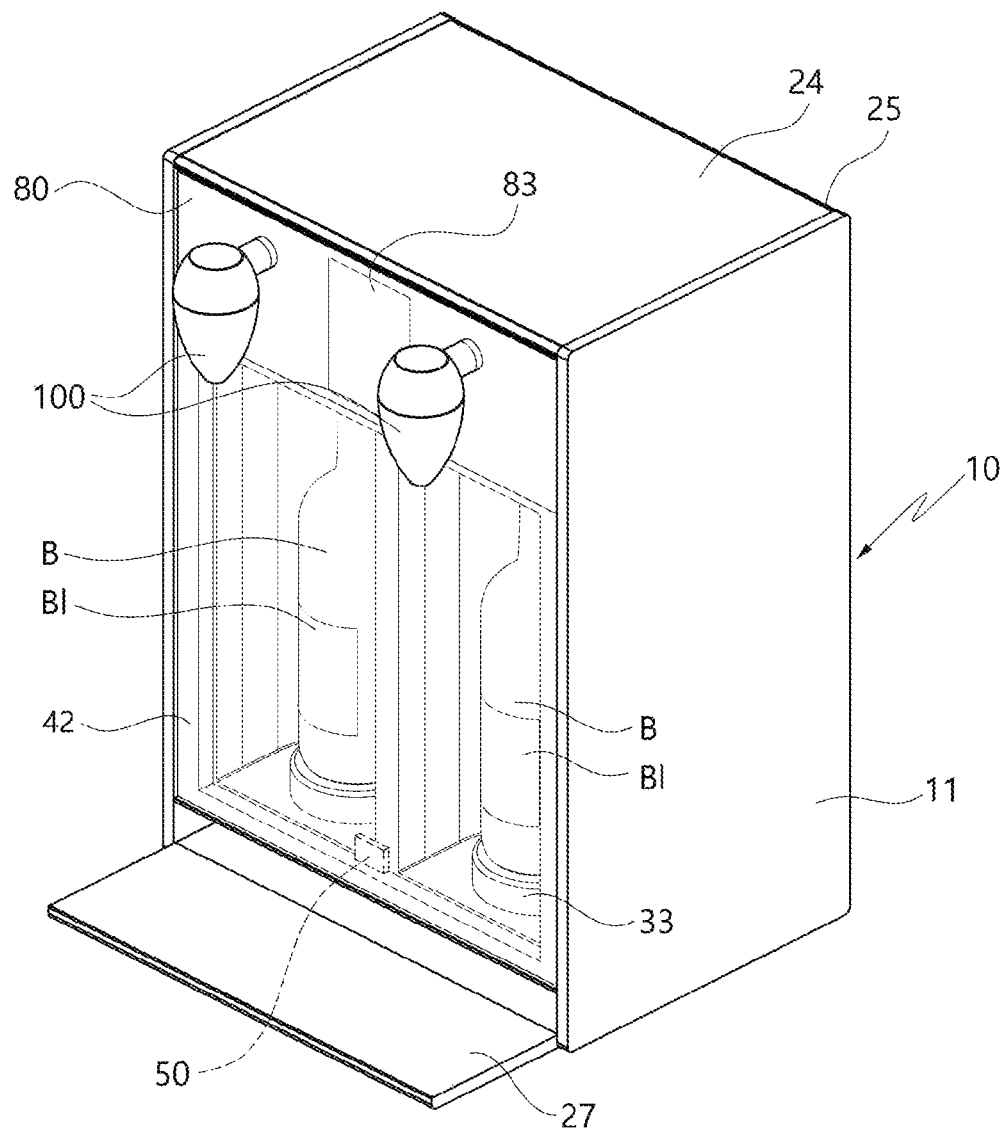
FIG. 6 is a perspective view illustrating a state in which the door constituting the wine storage device of the present disclosure according to the embodiment is closed.

FIGS. 4 to 6 illustrate that the label B1 of the wine bottle B is photographed through the vision sensor part 50. First, referring to FIG. 4, when a user opens the door 42 and places the wine bottle B inside the door 42, the vision sensor part 50 may capture the label B1. FIG. 4 illustrates a state in which the wine bottle B is disposed on the support plate 27 without being accommodated in the storage space 32. Alternatively, the label B1 of the wine bottle B may be captured by the vision sensor part 50 while the wine bottle B is accommodated in the storage space 32.

In this case, when the vision sensor part 50 has an angle of view difficult to accurately photograph the label B1, the angle of view of the vision sensor part 50 may be changed by adjusting the opening angle of the door 42. Comparing FIGS. 4 and 5, angles a1 and a2 formed by the door 42 and the front surface of the cabinet 10 may be different from each other, and accordingly, the angle of view of the vision sensor part 50 may also change.

In this case, when the vision sensor part 50 fails to extract characters or symbols included in the label B1 image, the main control part 150 may allow a user to recognize the result of extraction failure through a display device provided in the cabinet 10. Here, the extraction of characters and symbols may be performed by the image processing part 154 connected to the main control part 150. When the image processing part 154 fails to acquire the characters and symbols, this may be notified to a user. Acquisition of characters and symbols by the image processing part 154 and control of the display device may be performed by the main control part 150.

Here, the display device may be a display 83 provided on a front panel 80 of the cabinet 10 or a speaker (not shown). When a user finds that the angle of view of the vision sensor part 50 is not suitable through the display device, the user may adjust the angle of the door 42 to change the angle of view.

Looking at FIG. 6, a state in which the wine bottle B is stored in the storage space 32 is shown. Even in this state, the label B1 may be photographed through the vision sensor part 50. Compared with FIGS. 4 and 5, when the wine bottle B is stored in the storage space 32 as shown in FIG. 6, a distance between the vision sensor part 50 and the label B1 may be close, but there may be a space therebetween, so the vision sensor part 50 may capture the label B1.

When the acquisition of characters and symbols by the image processing part 154 fails, the main control part 150 may automatically change the angle of view of the vision sensor part 50 by moving up or down or rotating the support part 33.

In addition, when the acquisition of the information of the label B1 from an image captured by the vision sensor part 50 fails, a user may directly photograph the label B1 by using a user terminal. The image captured by the user terminal may be transmitted to the main control part 150 or to an external server through a communication module 156.

Figure 7:
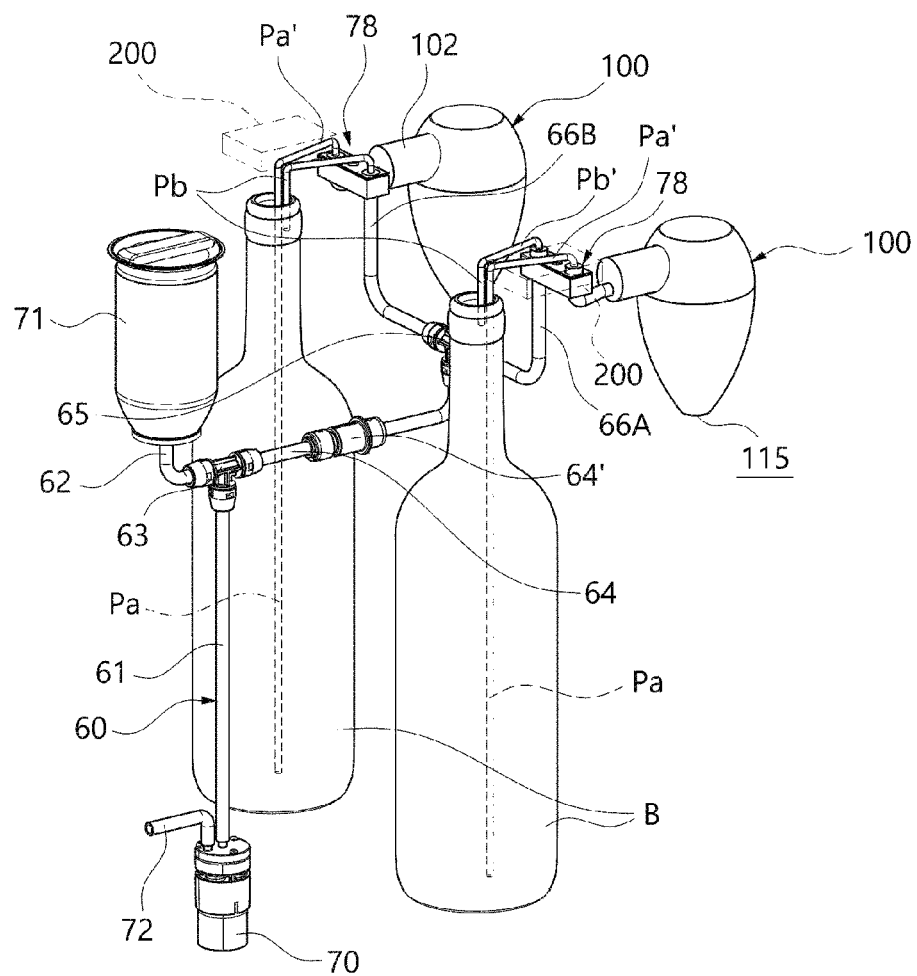
FIG. 7 is a perspective view illustrating the structures of an air pump and a gas tank installed inside the wine storage device according to the present disclosure.

Next, referring to FIG. 7, a wine dispensing structure mounted in the cabinet 10 will be described. FIG. 7 illustrates the structure of a supply pipe 60 for dispensing wine. For reference, the supply pipe 60 is intended to supply high-pressure air or inert gas to an injection pipe Pb, and may be installed in the installation space of the cabinet 10. In FIG. 7, the cabinet 10 and the inner casing 30 are omitted for ease of understanding.

The supply pipe 60 may be installed by crossing the inner space of the cabinet 10 and may be composed of multiple tubes. More specifically, the supply pipe 60 includes a pump connection line 61 coupled to an air pump 70 and a tank connection line 62 coupled to a gas tank 71. The pump connection line 61 and the tank connection line 62 may be installed in a position close to the rear plate 13 in the installation space of the cabinet 10.

In addition, the pump connection line 61 and the tank connection line 62 may be connected to a gas injection valve 63, which is a three-way valve, and a main supply line 64 may be connected to the gas injection valve 63. Accordingly, through the manipulation of the gas injection valve 63, one of the pump connection line 61 and the tank connection line 62 may be connected to the main supply line 64. For example, due to the operation of the gas injection valve 63, (i) when the pump connection line 61 and the main supply line 64 are connected to each other, air pressure increased in the air pump 70 is transferred to the main supply line 64, and (ii) when the tank connection line 62 and the main supply line 64 are connected to each other, an inert gas from the gas tank 71 is transferred to the main supply line 64.

The main supply line 64 may be again divided through branch lines 66A and 66B. The branch lines 66A and 66B may be intended to divide the main supply line 64 into several branches, and the number of the branch lines 66A and 66B may be equal to the number of the storage spaces 32, that is, the number of wine bottles B stored in the storage spaces 32. In the present embodiment, two branch lines 66A, 66B are provided.

In this case, a second valve 65 may be installed between the main supply line 64 and the two branch lines 66A and 66B. The second valve 65 may be configured as a three-phase valve, and may selectively connect the main supply line 64 to any one of the two branch lines 66A and 66B.

The branch lines 66A and 66B may be respectively connected to connection assemblies 78 to be described below, and each of the connection assemblies 78 may be connected to the injection pipe Pb and a dispensing pipe Pa described above. As a result, through the connection assembly 78, the injection pipe Pb and the branch lines 66A, 66B may be connected to each other, and the dispensing pipe Pa and the supply pipe 60 may be connected to each other. Of course, when there is one storage space 32 and only one wine bottle B is stored therein, the branch lines 66A, 66B may be omitted, and the main supply line 64 may be connected directly to the connection assembly 78.

More specifically, each of the end part Pb' of the injection pipe Pb and the end part Pa' of the dispensing pipe Pa may extend in a direction orthogonal to the longitudinal direction of the wine bottle B, and the end part may again extend in the longitudinal direction of the wine bottle B and may be exposed downward. FIG. 7 illustrates a state in which the end part Pb' of the injection pipe Pb and the end part Pa' of the dispensing pipe Pa extend from the upper part of the wine bottle. Each of the end part Pb' of the injection pipe Pb and the end part Pa' of the dispensing pipe Pa may be connected to the inside of the connection assembly 78.

In this case, the end part Pa' of the dispensing pipe Pa may be connected to a temperature adjustment module 200 to be described below. When the temperature adjustment module 200 is connected to the end part Pa' of the dispensing pipe Pa, the temperature of wine discharged to the dispensing head 100 through the end part Pa' of the dispensing pipe Pa may be adjusted. In the present embodiment, the temperature adjustment module 200 may be provided with a heating unit HM and a cooling unit CM, and thus wine may be heated or cooled while the wine is dispensed. This structure will be described again below.

A control valve 64' may be installed on the main supply line 64. Even if the air pump 70 does not operate when the gas injection valve 63 is opened toward the air pump 70, the control valve 64' may prevent air introduced from an air supply pipe 72 connected to the air pump 70 from being delivered to the injection pipe Pb, and may be installed at the center of the main supply line 64.

Meanwhile, the air pump 70 and the gas tank 71 may be installed inside the cabinet 10. The air pump 70 may be intended to supply high-pressure air to the main supply line 64 and may be operated by receiving power. When the air pump 70 injects high-pressure air into the wine bottle B through the main supply line 64, pressure inside the wine bottle B may increase, and beverage may be discharged through the dispensing pipe Pa. Accordingly, a beverage may be supplied to a user through the supply pipe 60.

The air pump 70 is installed at a position close to the bottom of the cabinet 10 at the rear of the storage space 32. When the air pump 70 is located at the rear side, the degree of transmission of noise generated during operation of the air pump 70 to the front side may be reduced.

The air supply pipe 72 may be connected to the air pump 70, and one side of the air supply pipe 72 may be open so that the air supply pipe 72 can receive air from the outside. In the present embodiment, although the air pump 70 is operated by power as an example, the air pump 70 may have a tank structure in which high-pressure gas is prepared in a compressed state.

The gas tank 71 may have an inert gas inside, and may selectively supply the inert gas to the wine bottle B through the main supply line 64. When the inert gas is injected into the wine bottle B through the injection pipe Pb, the oxidation of a beverage due to oxygen present in the wine bottle B may be prevented. Such an inert gas may include an inert gas such as nitrogen, helium gas, argon gas, and carbon dioxide, or a mixture of at least one of the above gases.

In the present embodiment, the gas tank 71 is only for the purpose of preventing the oxidation of a beverage, and the air pump 70 described above is responsible for dispensing wine. Accordingly, since the inert gas of the gas tank 71 is only intermittently injected into the wine bottle B, the consumption rate of the gas tank 71 may be reduced. Alternatively, the air pump 70 may be omitted, and the gas tank 71 may also be in charge of dispensing wine.

The gas tank 71 may be accommodated inside the cabinet 10 in a direction in which the gas tank 71 is erected through a tank mounting hole 23 formed in the upper cover 20 of the cabinet 10. The tank mounting hole 23 may be made through the upper cover 20 like an open hole 22, and may be formed closer to the rear plate 13 than to the open hole 22.

Since the gas tank 71 is installed in the tank mounting hole 23, the tank mounting hole 23 may be selectively covered by the door 42. That is, a portion of the gas tank 71 is exposed in FIG. 1, but when the door 42 is closed, the gas tank 71 is not exposed to the outside. Conversely, when only the door 42 is opened, a user may easily separate the gas tank 71 from the tank mounting hole to replace the same.

In the present embodiment, the gas tank 71 and the air pump 70 may be installed inside the cabinet 10, but otherwise, the gas tank 71 and the air pump 70 may be prepared as separate objects outside the cabinet 10. In this case, the supply pipe 60 may be further extended to the outside of the cabinet 10 and connected to the gas tank 71 and the air pump 70.

The front panel 80 may be disposed at a position adjacent to the dispensing head 100. The front panel 80 may be disposed on the upper part of the front surface of the cabinet 10. In the present embodiment, the front panel 80 may extend to be long left and right. The front panel 80 may be provided on the upper part of the front surface of the cabinet 10 and may be formed in a flat plate shape. Parts including the injection pipe Pb may be disposed behind the front panel 80. In the present embodiment, the front panel 80 may be located inside the second panel 44 of the door 42, which is located relatively outside, as described above. Unlike this, the height of the second panel 44 may be lower, and the front panel 80 may fill the remaining portion.

The display 83 may be provided on the front panel 80. The display 83 may provide information on the wine storage device or provide an interface for inputting a command. In the present embodiment, the display 83 may receive a touch input.

The display 83 may display various information such as the temperature of the storage space 32, the storage period of a stored beverage, and the type of a beverage, and a user may input information about desired aerating intensity, the temperature of the storage space 32, brightness of internal light, and the power on/off of a refrigerator, etc.

In addition, various information on the wine measured by the vision sensor part 50 and a temperature sensor 55 may be displayed on the display 83. For example, the display 83 may display information on the type, place of production, and year of production of the wine obtained from the vision sensor part 50, and at least one information of sugar content, pH (hydrogen ion concentration), alcohol concentration, and tannin concentration of the wine transmitted from the temperature sensor 55.

Aerating intensity automatically preset by the main control part 150 to suit the characteristics of the wine may be displayed through the display 83. Apart from this, a user may input desired aerating intensity through the display 83 which is an input part. Aerating part A may discharge wine with aerating intensity input by a user. In addition, a database 152 may store aerating intensity input by a user, and the main control part 150 may learn the aerating intensity.

The dispensing head 100 may be provided on the cabinet 10. The dispensing head 100 may serve to discharge wine contained in the wine bottle B to the outside. In the present embodiment, the dispensing head 100 may protrude from the upper part of the front surface of the cabinet 10 and may include two dispensing heads. The two dispensing heads 100 may respectively be connected to separate wine bottles B.

The dispensing head 100 may be connected to the dispensing pipe Pa coupled to the connection assembly 78. Wine supplied to the dispensing pipe Pa may be supplied to the outside through a wine outlet 115 formed in the dispensing head 100.

Figure 8:
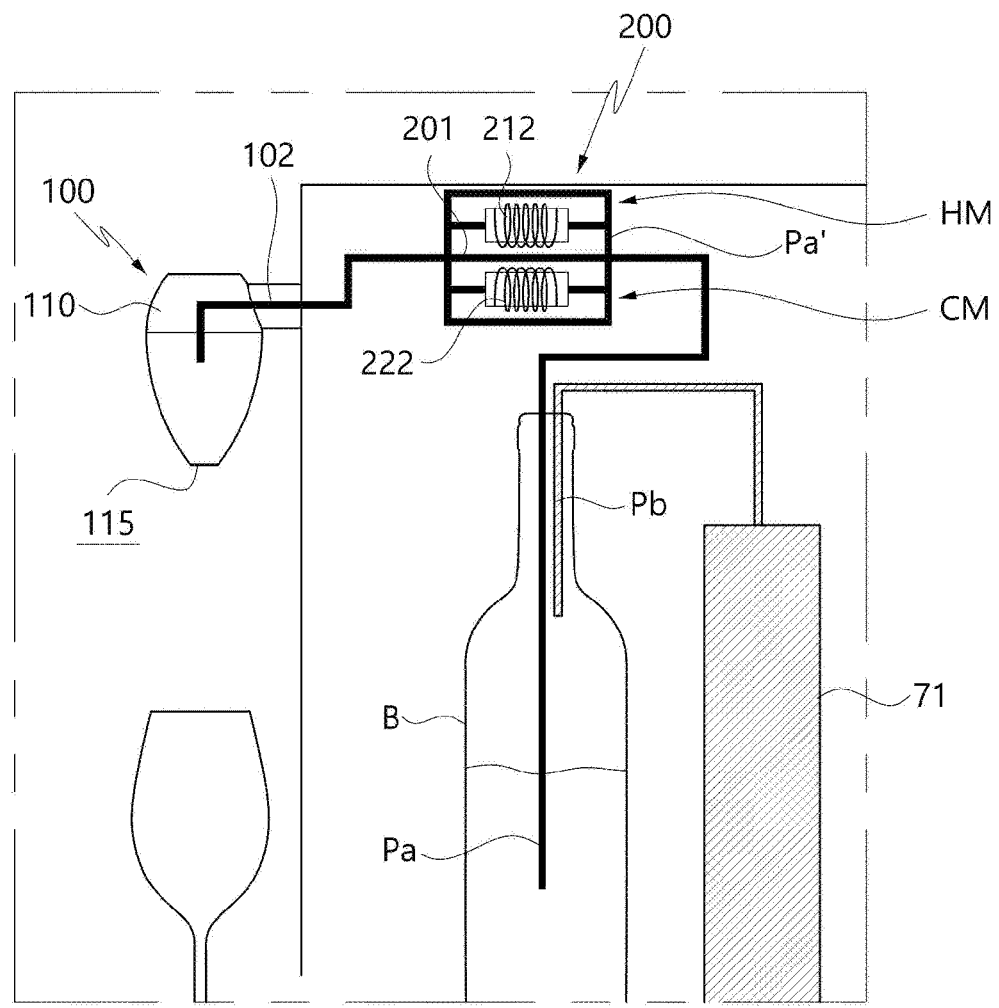
FIG. 8 is a structural schematic diagram illustrating the internal structure of the wine storage device according to the present disclosure.

Referring to FIG. 8, the dispensing head 100 may include a head body 110 arranged in a vertical direction. In the present embodiment, the head body 110 may have a curved side surface, and this shape may be changed. A nozzle connection pipe 102 may be connected to the head body 110, and may serve to supply wine by being connected to the end part Pa' of the dispensing pipe Pa described above.

The wine outlet 115 on the lower end of the head body 110 may be open. The wine outlet 115 corresponds to a part through which wine is finally discharged to the outside. Although not shown, a contact space may be defined between the wine outlet 115 and the nozzle connection pipe 102 inside the head body 110. The contact space may be an empty space for increasing the amount of contact of wine with air in the process of discharging the wine discharged through the dispensing pipe Pa to the outside. That is, in the contact space, wine may be aerated. Of course, a separate aerating part may be installed inside the contact space.

Figure 15:
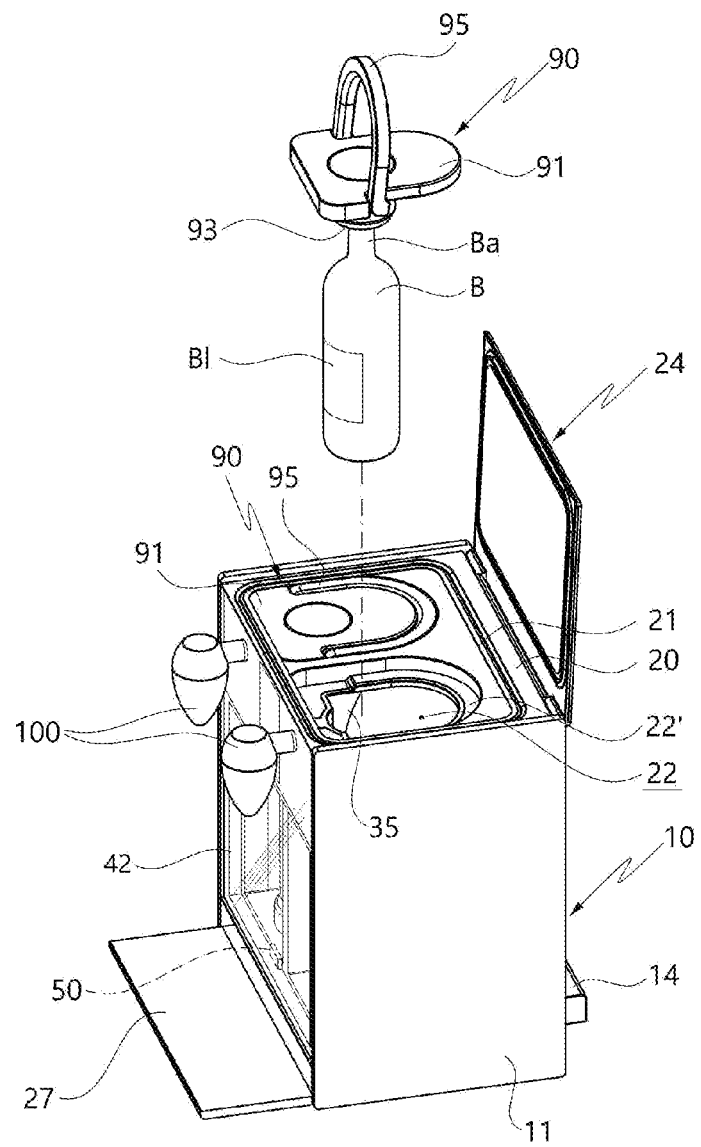
FIG. 15 is a perspective view of the wine storage device according to another embodiment of the present disclosure.

Meanwhile, FIG. 15 shows another embodiment of the door 42. In the previous embodiment, the door 42 constitutes the front surface of the cabinet 10, whereas in the present embodiment, the door 42 may constitute the upper surface of the cabinet 10. FIG. 15 illustrates a state in which the cover assembly 90 serving as the door 42 is assembled with the inlet Ba of the wine bottle B.

Specifically, the inlet Ba of the wine bottle B in an open state may be fitted into the cover assembly 90. The cover assembly 90 may serve to block the inlet Ba of the wine bottle B and at the same time, may serve to cover the open hole 22 located in the center of the upper cover 20.

Additionally, when a user raises the cover assembly 90, the wine bottle B fitted into the cover assembly 90 may also come out of the storage space 32 together. Conversely, after fitting the wine bottle B into the cover assembly 90, the wine bottle B may be received in the storage space 32. Accordingly, the cover assembly 90 may also function as a kind of handle.

Looking at the components of the cover assembly 90, the cover assembly 90 may include a cover plate 91 for covering the open hole 22, and a coupling part 93 extending downward from the cover plate 91 so that the inlet Ba of the wine bottle B is fitted into the coupling part. Furthermore, a handle part 95 may be rotatably assembled with the cover plate 91, and when the handle part 95 is rotated and is erected, a user may grip the handle part.

The cover plate 91 may be a part that is held by and fixed to the edge of the open hole 22 of the upper cover 20. In the present embodiment, the cover plate 91 may have a roughly plate-like structure. One side of the cover plate 91 may be rectangular, and the other side thereof may be formed in an arc shape, so the two sides may be asymmetrical to each other. Furthermore, the other side of the cover plate 91 formed in an arc shape may be surrounded by the handle part 95.

The cover plate 91 may cover the open hole 22 and a surrounding thereof, and thus when the cover assembly 90 is assembled to the upper cover 20, the cover assembly 90 may serves as a kind of inner door 42. Furthermore, when the cover assembly 90 is assembled to the upper cover 20, the cover assembly 90 may not be moved from the assembled position, so the inlet Ba of the wine bottle B fitted into the cover assembly 90 may be naturally fixed in an accurate position. Particularly, as illustrated in FIG. 21, a seating part 22' around the open hole 22 and the cover plate 91 may be made in shapes corresponding to each other, and since the cover plate 91 has an asymmetrical front-to-rear structure, the cover plate 91 may be unlikely to be misassembled.

The coupling part 93, which is located on the lower side of the cover plate 91, may protrude downward from the cover plate 91 to be inserted into the open hole 22, more specifically, into the storage space 32 to some extent. The inlet Ba of the wine bottle B may be fitted into the coupling part 93 and may be covered.

When moving the wine bottle B by inserting the wine bottle B into the cover assembly 90, the handle part 95 may be used in an erected state as shown in FIG. 21, but may be rotated to form a continuous plane with the cover plate 91 after the wine bottle B is received in the storage space 32. That is, the handle part 95 may be regarded as constituting a portion of the cover plate 91.

In this case, when the handle part 95 is rotated and raised, a portion of the handle part 95 may transform the coupling part 93 so that the inlet Ba of the wine bottle B is strongly pressed to the inside of the coupling part 93 to be fixed.

Figure 19:
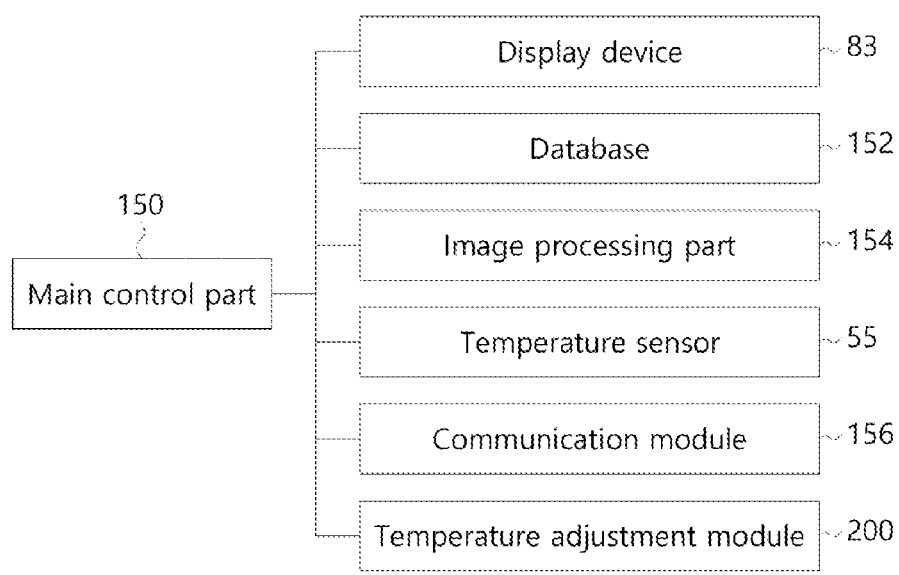
FIG. 19 is a diagram schematically illustrating the structure of a main control part and components connected thereto constituting the wine storage device according to the embodiment of the present disclosure.

Referring to FIG. 19, the main control part 150 and components controlled by the main control part 150 constituting the wine storage part according to the embodiment of the present disclosure are illustrated. As illustrated in the drawing, the main control part 150 may control the display device including the display 83 described above. Here, the display device may include a speaker as well as the display 83.

In addition, the main control part 150 may control the database 152. Wine information may be stored in the database 152. Here, the wine information may include not only fixed conditions obtained from the label B1 by the vision sensor part 50, such as the type of wine, but also wine information input by a user or already stored wine information.

In addition, in the database 152, a storage temperature and a drinking temperature suitable for the type of wine may be pre-stored, and a drinking temperature input by a user may be stored. Additionally, in the database 152, various pieces of information about wine and a drinking temperature thereof received from an external server may be stored, and stored information may be transmitted to the external server. The transmission and reception of such information may be performed by the communication module 156 mounted in the cabinet 10.

A sensing module may be connected to the main control part 150. The sensing module may include the vision sensor part 50 and the temperature sensor 55 described above. Information measured by the vision sensor part 50 and the temperature sensor 55 may be analyzed by the main control part 150 and then stored in the database 152. For example, the main control part 150, which includes the image processing part 154, may obtain characters/symbols from an image obtained by the vision sensor part 50 and may adjust a dispensing temperature by analyzing the temperature of wine measured by the temperature sensor 55.

Figure 9:
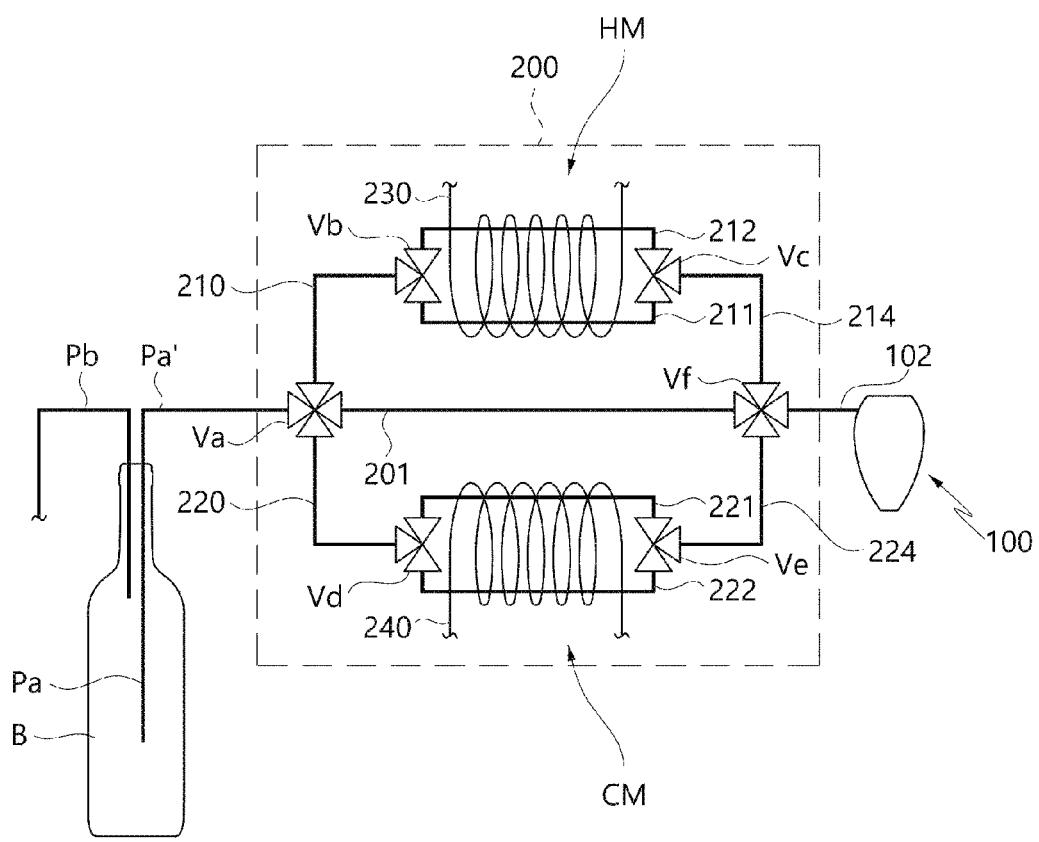
FIG. 9 is a structural schematic diagram illustrating a dispensing path of wine based on a temperature adjustment module of the wine storage device according to the embodiment of the present disclosure.

Next, referring to FIGS. 9 to 14, the process of adjusting the drinking temperature of wine will be described. FIG. 9 schematically illustrates the structure of the temperature adjustment module 200. As described above, the temperature adjustment module 200 may be disposed between the end part Pa' of the dispensing pipe Pa and the dispensing head 100. Accordingly, the temperature adjustment module 200 may adjust the temperature of the stored wine when the wine is discharged.

In the present embodiment, since the temperature adjustment module 200 is disposed between the end part Pa' of the dispensing pipe Pa and the dispensing head 100, the temperature adjustment module 200 may constitute a portion of a dispensing path. Accordingly, even though the wine storage device includes the temperature adjustment module 200, the internal structure of the wine storage device may be simplified.

The temperature adjustment module 200 may include multiple pipes and valves connecting the pipes to each other. The temperature adjustment module 200 may have several wine movement paths and may implement a different function in each wine movement path.

Specifically, the temperature adjustment module 200 may have the heating unit HM and the cooling unit CM, wherein the heating unit HM and the cooling unit CM may form independent paths. In the present embodiment, the heating unit HM and the cooling unit CM may be arranged in parallel with each other between the end part Pa' of the dispensing pipe Pa and the dispensing head 100, and thus after wine passes through the heating unit HM or the cooling unit CM, the wine may be transferred to the dispensing head 100.

The temperature adjustment module 200 may include an introduction valve Va disposed between the end part Pa' of the dispensing pipe Pa and the heating unit HM or between the end part Pa' and the cooling unit CM. The introduction valve Va may allow wine discharged from the wine bottle B to be delivered to any one of the heating unit HM and the cooling unit CM. The introduction valve Va may be configured as a valve that selectively changes a flow path in a plurality of directions, such as a 3-way valve or a 4-way valve.

The introduction valve Va may be controlled by the main control part 150, and may serve to transfer wine discharged from the wine bottle B to the heating unit HM or the cooling unit CM. For example, when the storage temperature of wine is higher than the drinking temperature, the introduction valve Va may induce the wine to be delivered to the cooling unit CM.

Meanwhile, the temperature adjustment module 200 may include a direct dispensing part 201 that allows wine to be directly dispensed without passing through the heating unit HM and the cooling unit CM. The direct dispensing part 201 may connect the introduction valve Va with a discharge valve Vf to be described below, and may constitute a path independent of the heating unit HM and the cooling unit CM. Accordingly, when the wine is dispensed through the direct dispensing part 201, a temperature thereof is not controlled, and in this case, the storage temperature of the wine may be the drinking temperature thereof.

A heating introduction pipe 210 and a cooling introduction pipe 220 may be connected to the introduction valve Va. The heating introduction pipe 210 may connect the introduction valve Va with the heating unit HM, and the cooling introduction pipe 220 may connect the introduction valve Va with the cooling unit CM.

The heating unit HM may be connected to the heating introduction pipe 210. The heating unit HM may constitute a portion of a path through which the wine is dispensed. The heating unit HM may serve to heat and discharge wine. That is, when the wine is discharged through the heating unit HM, the wine may be supplied to a user after being adjusted to a temperature higher than the storage temperature of the wine.

Looking at the configuration of the heating unit HM, the heating unit HM may include at least two heating pipes 211, 212. The heating pipes 211 and 212, which are pipes through which the wine passes, may be heated by a heating means 230. In the present embodiment, the heating means 230 may be configured as an induction heater. That is, the heating means 230 may have a working coil therein, and may inductively heat the heating pipes 211 and 212 by a magnetic field generated from the working coil. Alternatively, the heating means 230 may be configured as a heating wire surrounding the heating pipes 211 and 212.

In the present embodiment, the heating pipe 211, 212 may include two heating pipes, and the two heating pipes 211, 212 may be connected in parallel with each other. Furthermore, the two heating pipes 211, 212 may be connected to each other to form one closed loop path. Here, the closed loop path means a circulation path, and wine may continuously circulate through the two heating pipes 211 and 212. the closed loop path.

More specifically, the heating pipe 211, 212 may include a first heating pipe 211 and a second heating pipe 212. The opposite ends of each of the first heating pipe 211 and the second heating pipe 212 may be respectively connected to a first heating valve Vb and a second heating valve Vc. By controlling the first heating valve Vb and the second heating valve Vc, the first heating pipe 211 and the second heating pipe 212 may become one continuous circulation path. That is, after the wine passes through (i) the introduction valve Va, the heating introduction pipe 210, the first heating valve Vb, the first heating pipe 211 in order, the wine may again pass through (ii) the second heating valve Vc, the second heating pipe 212, the first heating valve Vb, the first heating pipe 211, and the second heating valve Vc to be circulated. Furthermore, after the circulation of the wine, the wine may sequentially pass through a heating discharge pipe 214, the discharge valve Vf, and the nozzle connection pipe 102, and may be transmitted to the dispensing head 100.

Alternatively, wine may pass through only the first heating pipe 211 or only the second heating pipe 212. For example, the wine may be delivered through the introduction valve Va, the heating introduction pipe 210, the first heating valve Vb, the first heating pipe 211, the second heating valve Vc, the heating discharge pipe 214, the discharge valve Vf, and the nozzle connection pipe 102 to the dispensing head 100. Accordingly, the wine may be discharged after being heated while passing through only one of the first heating pipe 211 and the second heating pipe 212 constituting the heating unit HM.

Meanwhile, the cooling unit CM connected in parallel with the heating unit HM may constitute a portion of a path through which the wine is discharged out. The cooling unit CM may constitute a path independent of the heating unit HM or the direct dispensing part 201 and may serve to cool and discharge wine. That is, when the wine is discharged through the cooling unit CM, the wine may be supplied to a user after being adjusted to a temperature lower than the storage temperature of the wine.

Looking at the configuration of the cooling unit CM, the cooling unit CM may include at least two cooling pipes 221, 222. The cooling pipes 221 and 222 may be pipes through which wine passes, and may be cooled by a cooling means 240. In the present embodiment, the cooling means 240 may be configured as a cooling tank filled with cooling water. Furthermore, while wine flowing in the cooling pipes 221, 222 passes through the cooling means 240, the wine may be cooled rapidly and discharged. Alternatively, the cooling means 240 may be configured as an evaporator constituting a refrigeration cycle or may be configured as the thermoelectric element to maintain the temperatures of the cooling pipes 221 and 222 low through a Peltier effect.

In the present embodiment, two cooling pipes 221, 222 may be provided, and the two cooling pipes 221, 222 may be connected in parallel with each other. Furthermore, the two cooling pipes 221, 222 may be connected to each other to form one closed loop path. Here, the closed loop path means a circulation path, and wine may continuously circulate through the two cooling pipes 221 and 222.

More specifically, the cooling pipes 221, 222 may include a first cooling pipe 221 and a second cooling pipe 222. The opposite ends of each of the first cooling pipe 221 and the second cooling pipe 222 may be connected to a first cooling valve Vd and a second cooling valve Ve. By controlling the first cooling valve Vd and the second cooling valve Ve, the first cooling pipe 221 and the second cooling pipe 222 may become one continuous circulation path. That is, after passing through (i) the introduction valve Va, the cooling introduction pipe 220, the first cooling valve Vd, and the first cooling pipe 221 in order, the wine may again pass through (ii) the second cooling valve Ve, the second cooling pipe 222, the first cooling valve Vd, the first cooling pipe 221, and the second cooling valve Ve to circulate. Furthermore, after the circulation, the wine may sequentially pass through a cooling discharge pipe 224, the discharge valve Vf, and the nozzle connection pipe 102 and may be delivered to the dispensing head 100.

Alternatively, wine may pass through only the first heating pipe 211 or only the second heating pipe 212. For example, after passing through the introduction valve Va, the cooling introduction pipe 220, the first cooling valve Vd, the first cooling pipe 221, the second cooling valve Ve, the cooling discharge pipe 224, and the discharge valve Vf, the wine may be delivered through the nozzle connection pipe 102 to the dispensing head 100. Accordingly, the wine may be discharged after being cooled while passing through only one of the first cooling pipe 221 and the second cooling pipe 222 constituting the cooling unit CM.

In this way, each of the heating unit HM and the cooling unit CM may form a closed loop path. That is, each of the heating unit HM and the cooling unit CM may form a kind of closed loop control system. Accordingly, each of the heating unit HM and the cooling unit CM may form a feedback control system, and in the feedback control system, an output signal may directly affect a control operation. Here, the output signal may be the temperature (a current temperature) of wine that has passed through the heating unit HM or the cooling unit CM.

The temperature sensor 55 may be disposed in the temperature adjustment module 200. In the present embodiment, the temperature sensor 55 may include a first sensor which measures the storage temperature of wine stored in the storage space, and a second sensor which measures the dispensing temperature (a current temperature) of the wine passing through the temperature adjustment module 200. In this case, the second sensor may be disposed on each of the second heating valve Vc and the second cooling valve Ve. The second sensor may measure the temperature of wine passing through the heating unit HM and the cooling unit CM, and determine whether the measured temperature is equal to a preset drinking temperature. That is, the second sensor may make an output signal for feedback control in a closed loop control system.

When each of the heating unit HM and the cooling unit CM forms a circulation path, the temperature of wine may be adjusted while circulating through the heating unit HM or the cooling unit CM. In this case, when the temperature control level of each of the heating means 230 and the cooling means 240 is maintained low, wine may be gradually heated or cooled while flowing along the circulation path. Accordingly, the deterioration of the unique characteristics of wine due to the rapid change of the temperature of the wine may be prevented.

Alternatively, the main control part 150 may control speed at which the wine flows through the heating unit HM and the cooling unit CM. The main control part 150 may adjust the pressure of the air pump 70 to control speed at which wine flows through the heating unit HM and the cooling unit CM, thereby controlling speed at which the wine is heated or cooled.

Figure 16:
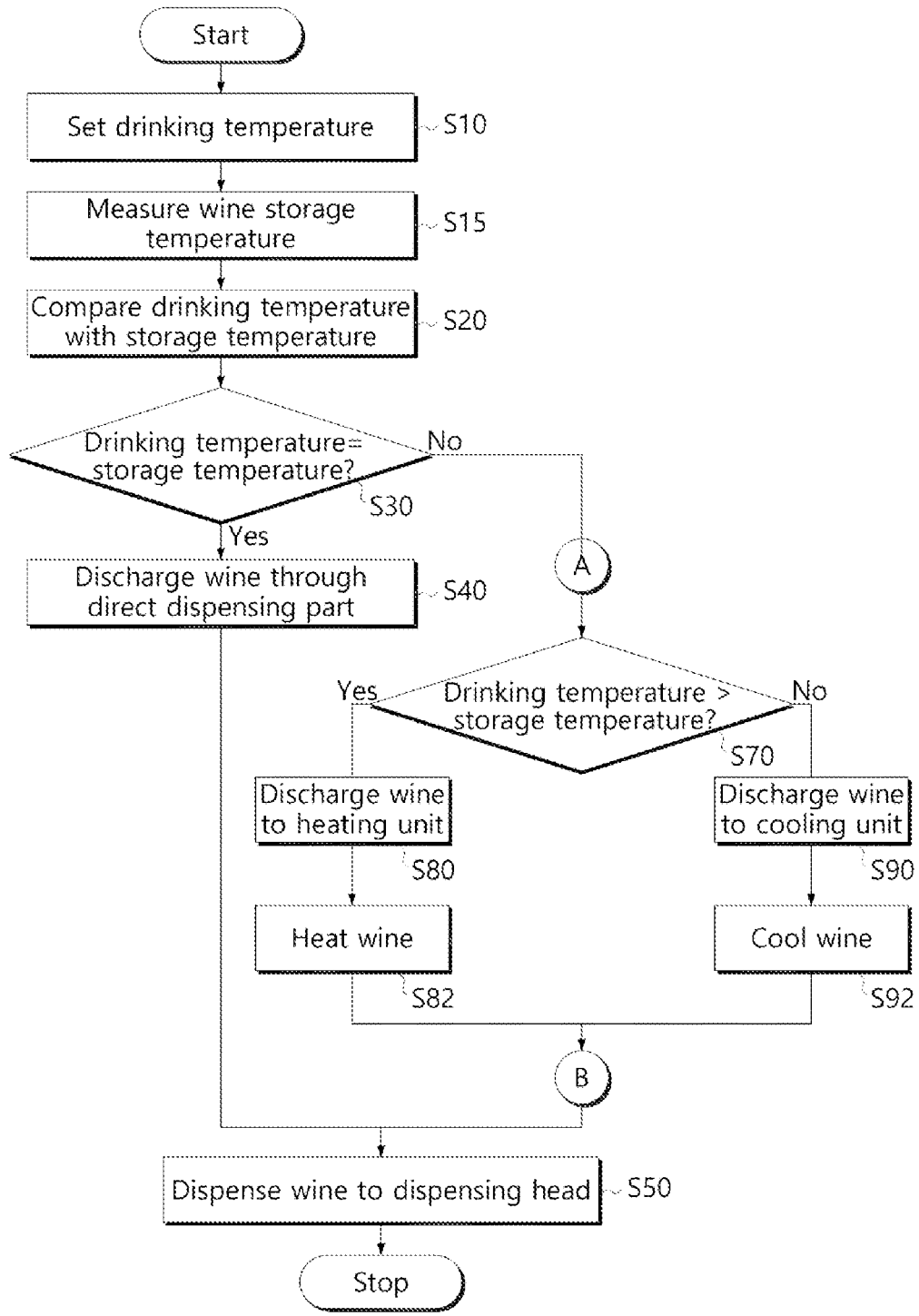
FIG. 16 is a flowchart illustrating the adjusting of the temperature of wine by using the wine storage device according to the present disclosure.
Figure 17:
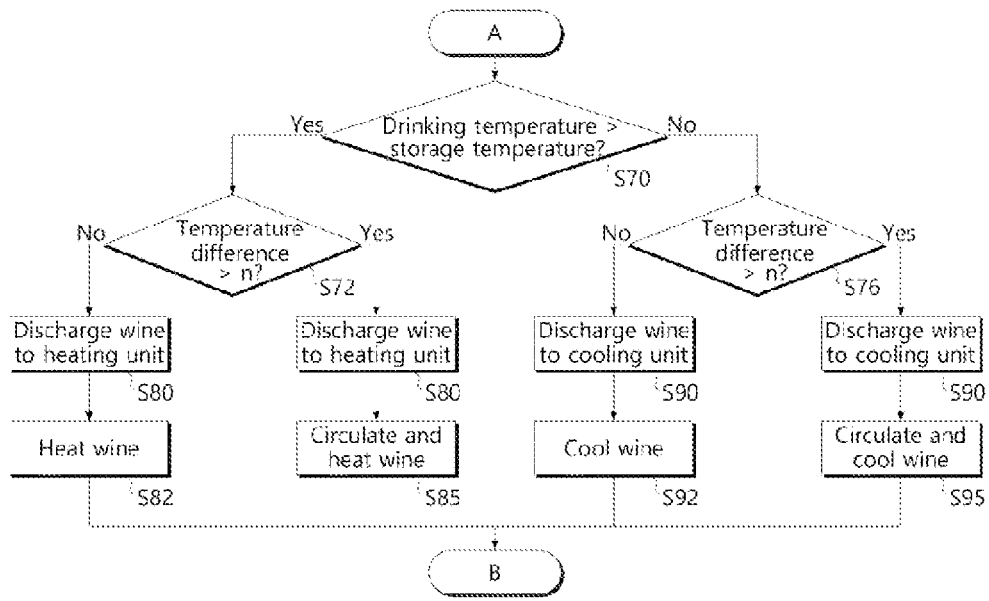
FIG. 17 is a flowchart illustrating, step by step, temperature adjustment methods preset different from each other according to the difference between the storage temperature and the drinking temperature of wine.

Referring to FIGS. 16 and 17, the process of adjusting the storage temperature of wine to the drinking temperature thereof will be described. Here, the storage temperature may mean the temperature of wine stored in the wine bottle, and the drinking temperature may mean a dispensing temperature discharged through the dispensing head 100. Depending on the type of wine, an appropriate storage temperature and an appropriate drinking temperature may differ from each other. In the present embodiment, the temperature adjustment module 200 may allow wine to have an appropriate drinking temperature.

In this case, the drinking temperature may be a value automatically preset from information previously stored in the database, or may be a value arbitrarily selected by a user. Furthermore, the previously stored information may be automatically obtained from the vision sensor part 50 described above. That is, the vision sensor part 50 may photograph the label B1 of the wine, and the value of the drinking temperature can be determined from the wine information obtained by the main control part 150.

In this way, the drinking temperature may be preset automatically or manually by a user at S10. In addition, the storage temperature of the wine may be measured by the first sensor at S15. Alternatively, the storage temperature of wine may be measured first.

Next, the main control part 150 may compare the drinking temperature with the storage temperature at S20. In addition, the main control part 150 may determine whether the drinking temperature of the wine and the storage temperature of the wine are the same at S30. When the drinking temperature and the storage temperature are the same, there is no need to adjust the temperature of the wine, so the wine may not be required to pass through the heating unit HM or the cooling unit CM. Accordingly, the wine may be guided to the direct dispensing part 201 (a direct water pipe) at S40, may be delivered to the dispensing head 100, and may finally be discharged at S50.

Figure 10:
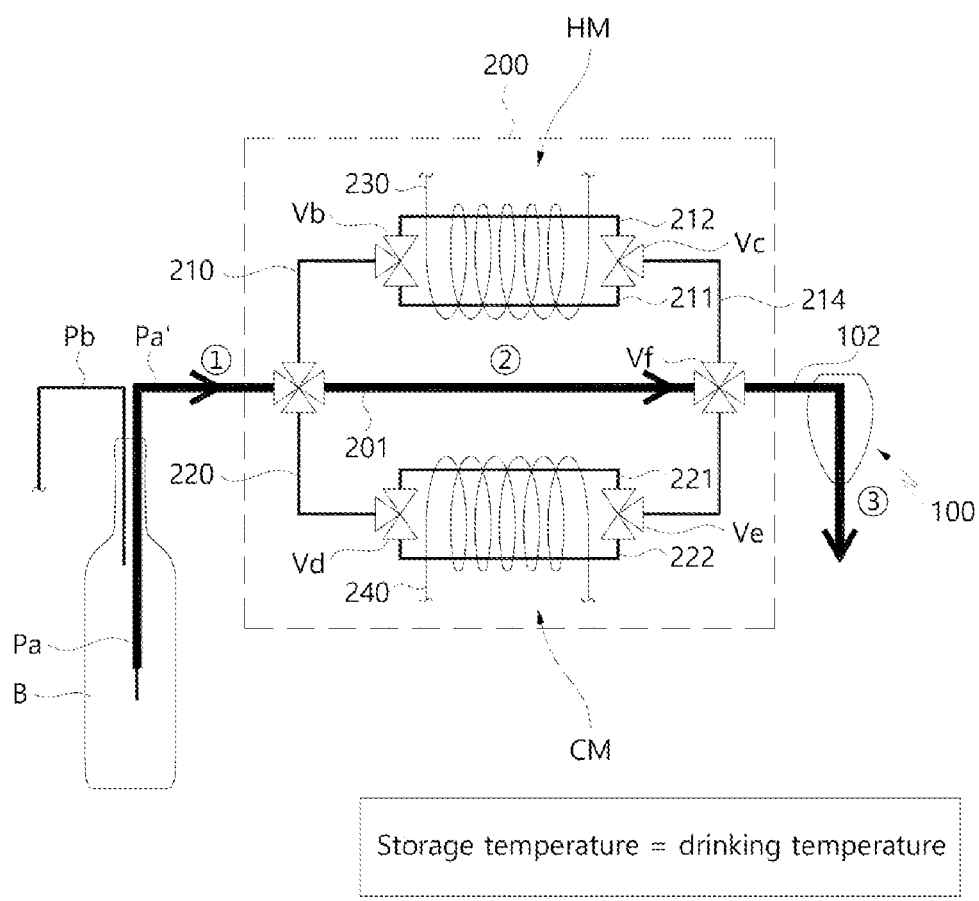
FIGS. 10 to 14 are structural diagrams illustrating the dispensing paths of wine formed differently according to a difference between the storage temperature and the drinking temperature of wine.

Such a flow of wine is shown in FIG. 10. As illustrated in the drawing, wine may be discharged from the wine bottle B and delivered through the end part Pa' of the dispensing pipe Pa to the introduction valve Va, wherein the introduction valve Va may guide the wine to the direct dispensing part 201. In addition, wine that has passed through the direct dispensing part 201 may be discharged through the discharge valve Vf to the dispensing head 100.

In this case, in a case in which the drinking temperature and the storage temperature do not completely match, when a difference between the drinking temperature and the storage temperature is less than a reference value, the wine may be discharged through the direct dispensing part 201. For example, when the difference between the drinking temperature and the storage temperature is within 1° C., the main control part 150 may dispense the wine through the direct dispensing part 201 without guiding the wine to the heating unit HM or the cooling unit CM.

Meanwhile, when the drinking temperature and the storage temperature are not the same, the main control part 150 may determine whether the drinking temperature is higher or lower than the storage temperature at S70. When the drinking temperature is higher than the storage temperature, the main control part 150 may deliver wine to the heating unit HM at S80. In addition, when the drinking temperature is lower than the storage temperature, the main control part 150 may deliver the wine to the cooling unit CM at S90.

Wine delivered to the heating unit HM may be heated in the heating unit HM at S82 and delivered to the dispensing head 100 so that the wine can be dispensed at S50. In addition, wine delivered to the cooling unit CM may be cooled in the cooling unit CM at S92 and delivered to the dispensing head 100 to be dispensed at S50.

FIG. 17 shows a wine temperature control process by the heating unit HM and the cooling unit CM in more detail. First, the main control part 150 may determines a difference between the drinking temperature and the storage temperature at S70. When the temperature of the drinking temperature is higher, the main control part 150 may again determine the temperature difference between the drinking temperature and the storage temperature at S72. In this case, when the difference between the drinking temperature and the storage temperature is less than a preset value n, the temperature difference is not large, so the wine may be heated by the heating unit HM without being circulated, that is, may pass through any one of the first heating pipe 211 and the second heating pipe 212 at S80, S82.

When the temperature difference between the drinking temperature and the storage temperature is greater than the preset value n, the temperature of the wine may be gradually increased while the wine passes through the circulation path of the heating unit HM at S80, S85. Through this, the characteristics of the wine due to rapid increase of the temperature of the wine may be prevented from deteriorating.

Figure 11:
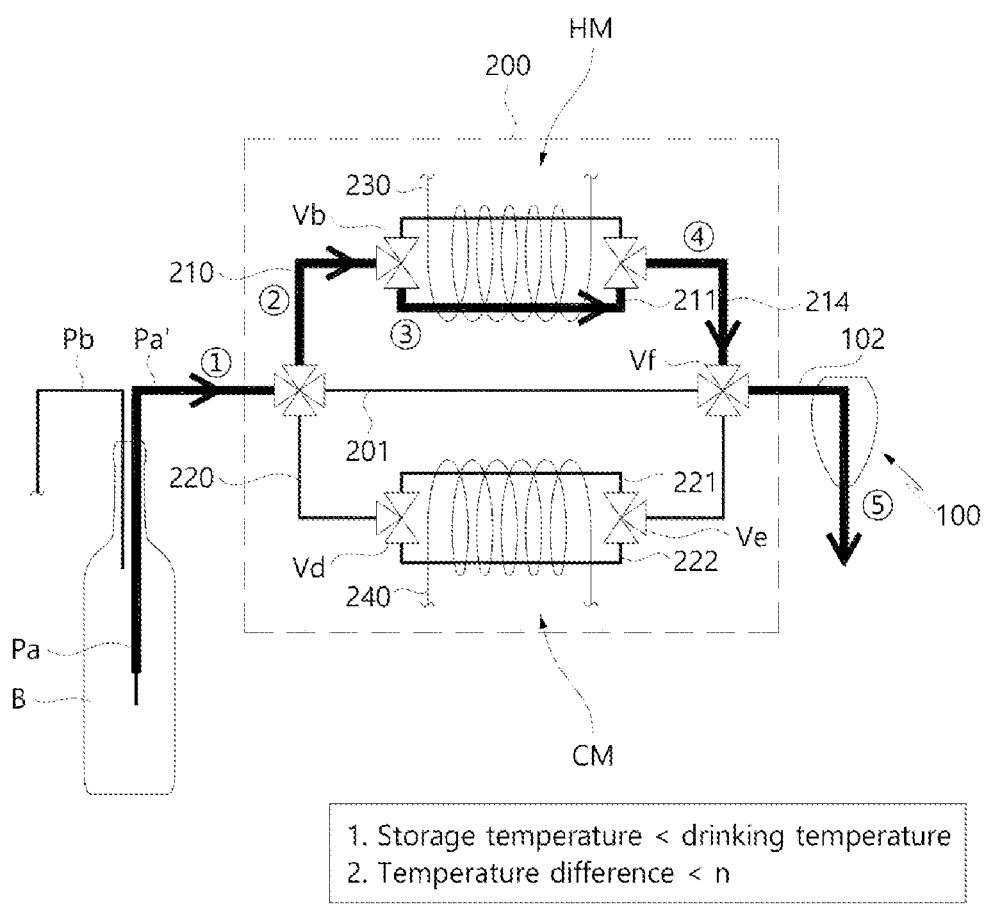
Figure 12:
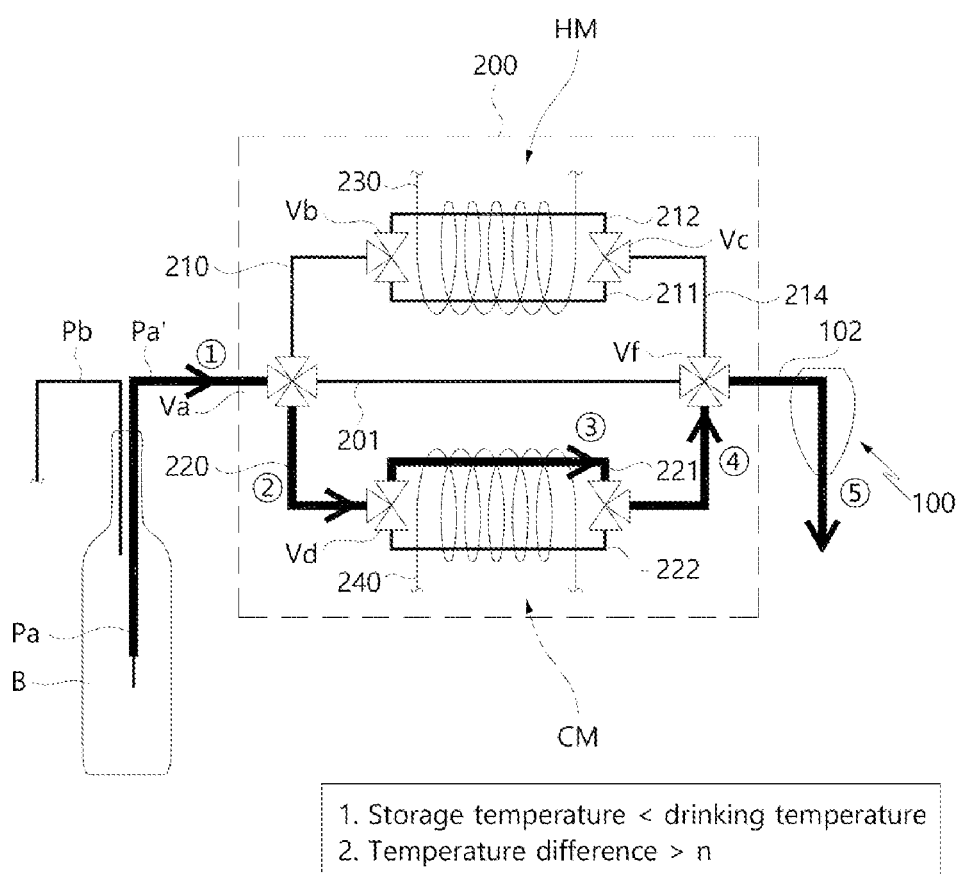

Referring to FIGS. 11 and 12, FIG. 11 illustrates a state in which wine is heated while passing through only the first heating pipe 211, and FIG. 12 illustrates a state in which wine is heated while circulating through the heating unit HM.

As described above, when the drinking temperature is higher than the storage temperature but the difference therebetween is less than the preset value n, the wine may be heated while passing through only the first heating pipe 211 (or the second heating pipe 212) as shown in FIG. 11. This is because there is no need to raise the temperature of the wine much since the temperature difference is small, and the temperature of the wine may be heated to a desired drinking temperature even if the wine passes through only the first heating pipe 211.

Looking at the process of dispensing wine after the wine is heated, the wine may be first delivered to the introduction valve Va through the end part Pa' of the dispensing pipe Pa (arrow ①). In addition, wine that has passed through the introduction valve Va may be guided to the first heating valve Vb through the heating introduction pipe 210 (arrow ②). The first heating valve Vb may guide the wine to the first heating pipe 211, and the wine may be heated while passing through the first heating pipe 211 (arrow ③).

The wine heated in this way may pass through the second heating valve Vc and be guided to the heating discharge pipe 214. The heating discharge pipe 214 may deliver wine to the discharge valve Vf (arrow ④). Furthermore, the discharge valve Vf may allow the wine to flow into the dispensing head 100 so that the wine can be supplied to the outside through the wine outlet 115 (arrow ⑤).

FIG. 12 illustrates a process in which wine is circulated and heated. As illustrated in the drawing, wine may be first delivered through the end part Pa' of the dispensing pipe Pa to the introduction valve Va (arrow ①). In addition, wine that has passed through the introduction valve Va may be guided to the first heating valve Vb through the heating introduction pipe 210 (arrow ②). The first heating valve Vb may guide the wine to the first heating pipe 211, and the wine may be heated while passing through the first heating pipe 211 (arrow ③).

Next, the wine that has passed through the second heating valve Vc may not be delivered to the heating discharge pipe 214, but may be delivered to the second heating pipe 212. The wine may be heated again while passing through the second heating pipe 212 (arrow ③').

In addition, the wine may be guided in a direction toward the first heating pipe 211 again by the first heating valve Vb. Accordingly, the heating unit HM may form a kind of circulation path, and the wine may be heated while continuously flowing along the first heating pipe 211 and the second heating pipe 212.

In this case, the heating level of the heating means 230 can be preset low. That is, the heating means 230 may be preset so that wine can be slowly heated. For example, the heating means 230 may be preset so that the temperature of the wine rises by 0.5° every time at which the wine circulates through the heating unit HM.

Figure 18:
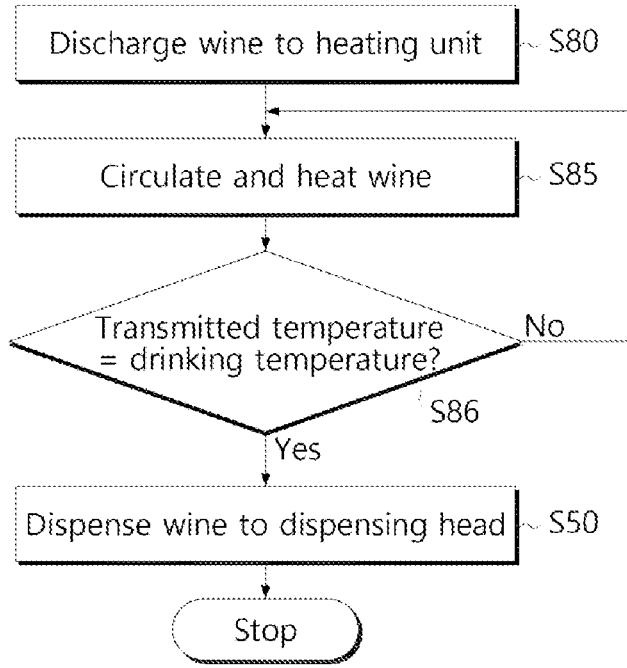
FIG. 18 is a flowchart illustrating, step by step, the heating of wine by circulating the wine.

A second temperature sensor 55 may be provided in the second heating valve Vc and may measure the temperature of wine being circulated and transmit the measured temperature to the main control part 150. That is, as illustrated in FIG. 18, the main control part 150 may determine whether the transmitted temperature is the same as the drinking temperature at S86, and when the temperature of the wine has not reached the drinking temperature, the second heating valve Vc may continue to circulate the wine.

When the temperature of the wine is equal to the drinking temperature, the main control part 150 may cause the second heating valve Vc to direct the wine in a direction toward the discharge valve Vf. The wine may flow to the discharge valve Vf through the heating discharge pipe 214 (arrow ④).

Finally, the discharge valve Vf may deliver the wine to the dispensing head 100, and the wine may be supplied to a user through the dispensing head (arrow ⑤). Accordingly, in present embodiment, wine may be gradually heated through a circulation heating path, so the taste or aroma of the wine may not be altered due to rapid heating.

Referring back to FIG. 17, the main control part 150 may determine the difference between the drinking temperature and the storage temperature at S70, and when the temperature of the drinking temperature is lower, may determine the temperature difference between the drinking temperature and the storage temperature again at S72. In this case, when the difference between the drinking temperature and the storage temperature is less than a preset value n, the temperature difference is not large, so the wine may be cooled by the cooling unit CM without being circulated, that is, may pass through only any one of the first cooling pipe 221 and the second cooling pipe 222 at S90, S92.

When the temperature difference between the drinking temperature and the storage temperature is greater than the preset value n, the temperature of the wine may gradually decrease while the wine passes through the circulation path of the cooling unit CM at S90, S95. Through this, the deterioration of the characteristics of the wine due to the rapid decrease of the temperature of the wine may be prevented.

Figure 13:
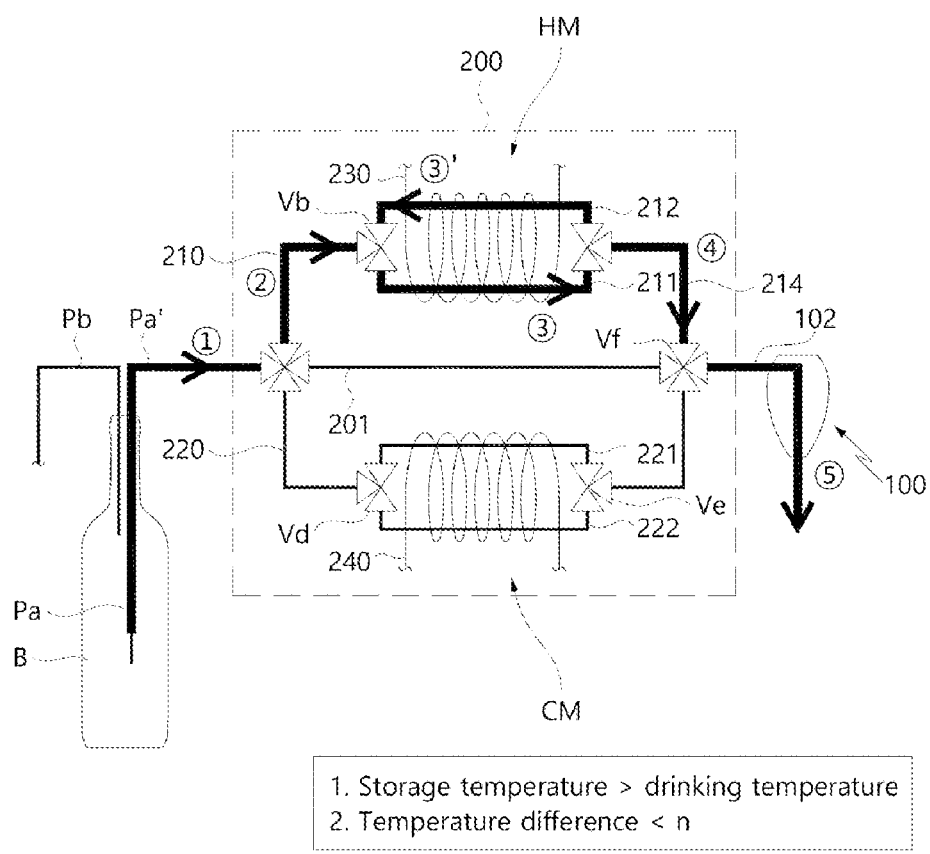
Figure 14:
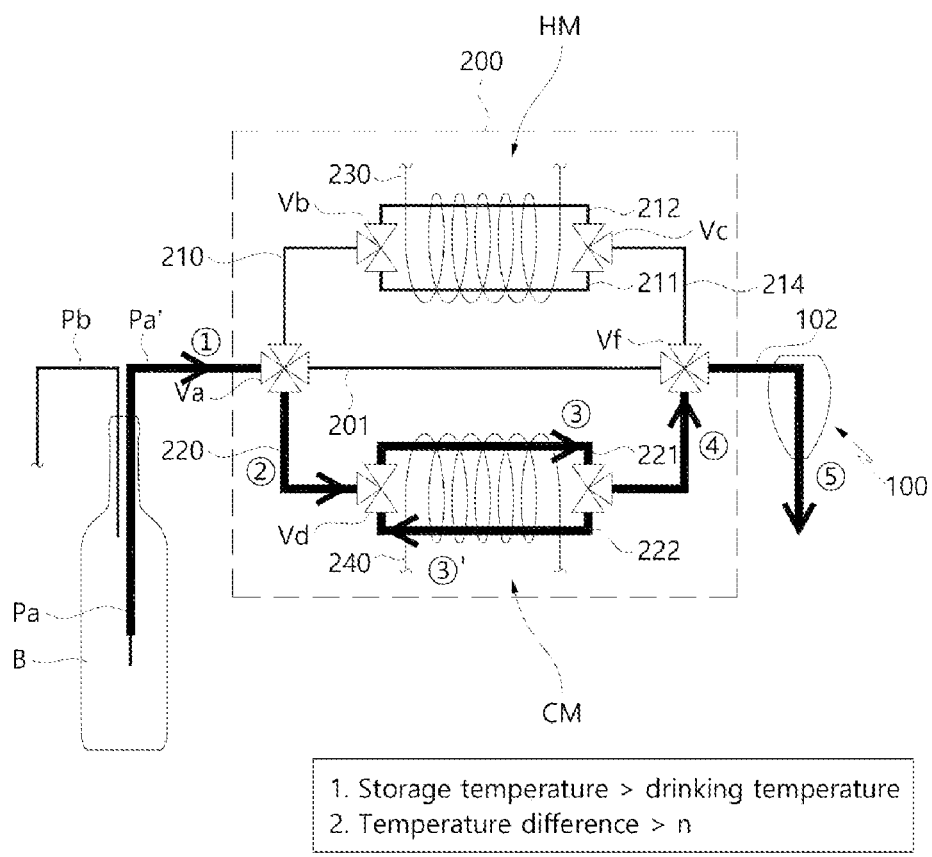

Referring to FIGS. 13 and 14, FIG. 13 illustrates a state in which wine is cooled while the wine passes through only the first cooling pipe 221, and FIG. 14 illustrates a state in which wine is cooled while the wine circulates through the cooling unit CM.

As described above, when the drinking temperature is lower than the storage temperature but the difference therebetween is less than a preset value n, the wine may be cooled while passing through only the first cooling pipes 221 (or the second cooling pipe 222) as illustrated in FIG. 13. This is because there is no need to lower the temperature of the wine much since the temperature difference is small, and the temperature of the wine may be cooled to a desired drinking temperature even if the wine passes through only the first cooling pipe 221.

Looking at the process of dispensing wine after the wine is cooled, the wine may be first delivered to the introduction valve Va through the end part Pa' of the dispensing pipe Pa (arrow ①). In addition, wine that has passed through the introduction valve Va may be guided to the first cooling valve Vd through the cooling introduction pipe 220 (arrow ②). The first cooling valve Vd may guide the wine to the first cooling pipe 221, and the wine may be cooled while passing through the first cooling pipe 221 (arrow ③).

The wine cooled in this way may pass through the second cooling valve Ve and be guided to the cooling discharge pipe 224. The cooling discharge pipe 224 may deliver wine to the discharge valve Vf (arrow ④). In addition, the discharge valve Vf may allow the wine to flow into the dispensing head 100 so that the wine can be supplied to the outside through the wine outlet 115 (arrow ⑤).

Referring to FIG. 14, the process of circulating and cooling wine is illustrated. As illustrated in the drawing, first, wine may delivered to the introduction valve Va through the end part Pa' of the dispensing pipe Pa (arrow ①). In addition, the wine that has passed through the introduction valve Va may be guided to the first cooling valve Vd through the cooling introduction pipe 220 (arrow ②). The first cooling valve Vd may guide the wine to the first cooling pipe 221, and the wine may be cooled while passing through the first cooling pipe 221 (arrow ③).

Next, the wine that has passed through the second cooling valve Ve may not be delivered to the cooling discharge pipe 224, but may be delivered to the second cooling pipe 222. The wine may be cooled again while passing through the second cooling pipe 222 (arrow ③').

In addition, the wine may be guided back toward the first cooling pipe 221 by the first cooling valve Vd. Accordingly, the cooling unit CM may form a kind of circulation path, and the wine may be cooled while continuously flowing along the first cooling pipe 221 and the second cooling pipe 222.

In this case, the cooling level of the cooling means 240 may be preset low. That is, the cooling means 240 may be preset so that wine can be cooled slowly. For example, the cooling means 240 may be preset so that the temperature of the wine decreases by 0.5° every time at which the wine circulates through the cooling unit CM.

The second cooling valve Ve may be provided with the second temperature sensor 55, and the second temperature sensor 55 may measure the temperature of wine being circulated and transmit the measured temperature to the main control part 150. The main control part 150 may determine whether the transmitted temperature is equal to the drinking temperature, and when the temperature of the wine has not reached the drinking temperature, the second cooling valve Ve may continue to circulate the wine.

When the temperature of the wine is equal to the drinking temperature, the main control part 150 may cause the second cooling valve Ve to direct the wine toward the direction of the discharge valve Vf. The wine may flow to the discharge valve Vf through the cooling discharge pipe 224 (arrow ④).

Finally, the discharge valve Vf may deliver the wine to the dispensing head 100, and the wine may be supplied to a user through the dispensing head (arrow ⑤). Accordingly, in the present embodiment, since wine is gradually cooled through a circulation cooling path, the taste or aroma of the wine may not be altered due to rapid cooling.

In the above, all the components according to the embodiment of the present disclosure are described as being coupled to each other as one or being operated in the coupled state, but the present disclosure is not necessarily limited to the embodiment. That is, if it is within the scope of the present disclosure, at least one of all of the components may be selectively combined and operated. In addition, the terms such as "include", "compose", or "have" as described above means that the corresponding components can be inherent unless specifically stated to the contrary. Accordingly, it should be interpreted that other components are not excluded, but may further be included. All terms, including technical or scientific terms, have the same meaning as generally understood by those skilled in the art to which the present disclosure belongs, unless otherwise defined. Commonly used terms, such as terms defined in a dictionary, should be interpreted as being consistent with the contextual meaning of the related art, and are not to be interpreted as ideal or excessively formal meanings unless explicitly defined in the present disclosure.

The invention claimed is:

1. A method of dispensing wine using a wine storage device, the method comprising:
   comparing a storage temperature of a storage space of the wine storage device and a preset dispensing temperature of the wine;
   when a difference between the storage temperature and the preset dispensing temperature is greater than or equal to a preset value, circulating the wine from a wine bottle in the a storage space to a temperature adjustment module, and operating at least one of a heater or a cooler included in the temperature adjustment module to adjust a temperature of the wine; and
   dispensing, through a dispensing head, the wine changed to have the preset dispensing temperature while circulating through the at least one of the heater or the cooler of the temperature adjustment module,
   wherein the heater comprises at least two heating pipes connected to each other to form a closed loop path, and
   wherein a valve is coupled to the at least two heating pipes and is controlled such that the wine passes through only one of the at least two heating pipes or is controlled such that the wine passes continuously circulate through the at least two heating pipes.

2. The method of claim 1, wherein:
   the heater includes a circulation heating path in which the wine is heated while circulating in the heater,
   the cooler includes a circulation cooling path in which the wine is cooled while circulating in the cooler, and
   when the difference between the storage temperature and the preset dispensing temperature is equal to or less than the preset value, the wine passes through the heater or the cooler once, and when the difference between the storage temperature and the preset dispensing temperature exceeds the preset value, the wine circulates through the heater or the cooler at least twice.

3. The method of claim 1, wherein at least one of a number of times that the wine circulates through the at least one of the heater or the cooler or a speed at which the wine circulates through the at least one of the heater or the cooler is controlled according to the difference between the storage temperature and the preset dispensing temperature, and
   wherein the wine is recirculated through at least one of the heater or the cooler when a difference between the temperature of the wine after passing through the temperature adjustment module and the preset dispensing temperature is greater than or equal to a particular value.

4. The method of claim 1,
   wherein the temperature adjustment module comprises a direct dispensing path that is separate from the heater and the cooler, and
   wherein when the storage temperature and the preset dispensing temperature of the wine are equal to each other, or when the difference between the storage temperature and the preset dispensing temperature is less than the preset value, the wine is delivered through the direct dispensing path to the dispensing head.

5. The method of claim 1, wherein the preset dispensing temperature is determined based on at least one of a user input or a stored appropriate drinking temperature of the wine.

* * * * *